US007654375B2

(12) United States Patent
Okada et al.

(10) Patent No.: US 7,654,375 B2
(45) Date of Patent: Feb. 2, 2010

(54) ROTATION TRANSMISSION DEVICE

(75) Inventors: Koichi Okada, Iwata (JP); Takahide Saito, Iwata (JP); Hiroshi Bunko, Iwata (JP); Tetsuya Yamamoto, Iwata (JP)

(73) Assignee: NTN Corporation, Osaka (JP)

( * ) Notice: Subject to any disclaimer, the term of this patent is extended or adjusted under 35 U.S.C. 154(b) by 7 days.

(21) Appl. No.: 10/591,160

(22) PCT Filed: Mar. 2, 2005

(86) PCT No.: PCT/JP2005/003516

§ 371 (c)(1),
(2), (4) Date: Aug. 30, 2006

(87) PCT Pub. No.: WO2005/083287

PCT Pub. Date: Sep. 9, 2005

(65) Prior Publication Data
US 2007/0170029 A1    Jul. 26, 2007

(30) Foreign Application Priority Data
Mar. 2, 2004   (JP)   ............... 2004-057567
Jul. 1, 2004   (JP)   ............... 2004-195769

(51) Int. Cl.
F16D 27/102   (2006.01)
F16D 27/14    (2006.01)
(52) U.S. Cl. .................. 192/35; 192/40; 192/84.1; 192/84.8; 192/103 R
(58) Field of Classification Search .............. 192/35, 192/38, 40, 84.1, 84.96, 84.8, 103 R
See application file for complete search history.

(56) References Cited

U.S. PATENT DOCUMENTS

| 3,581,156 | A  | * | 5/1971  | Dolbachian et al. ...... 361/154 |
| 4,460,076 | A  | * | 7/1984  | Yamada ...................... 192/35 |
| 5,348,126 | A  | * | 9/1994  | Gao ........................ 192/223.2 |
| 6,035,988 | A  | * | 3/2000  | Ito et al. ...................... 192/82 T |
| 6,244,403 | B1 | * | 6/2001  | Ito et al. ...................... 192/35 |
| 6,481,548 | B2 | * | 11/2002 | Monahan et al. ............... 192/38 |

(Continued)

FOREIGN PATENT DOCUMENTS

JP    62-32231    2/1987

(Continued)

OTHER PUBLICATIONS

Office Action issued Oct. 27, 2009 in the corresponding Japanese Patent Application No. 2004-057567 (with partial English translation).

Primary Examiner—Rodney H Bonck
(74) Attorney, Agent, or Firm—Wenderoth, Lind & Ponack, L.L.P.

(57) ABSTRACT

A rotation transmission device includes a roller clutch unit for selectively engaging an inner member mounted on a rotary shaft with an outer ring through rollers, and an electromagnetic clutch unit for electromagnetically controlling the selective engagement by the rollers. The current until the clutch engages is set so as to correspond to a state in which a maximum current according to the revolving speed is required and is varied according to the revolving speed of the rotary shaft to reduce power consumption and the size of the electromagnetic coil.

15 Claims, 13 Drawing Sheets

U.S. PATENT DOCUMENTS

| | | | |
|---|---|---|---|
| 6,698,563 B2 * | 3/2004 | Handa et al. | 192/35 |
| 6,755,763 B1 * | 6/2004 | Goto et al. | 475/231 |
| 6,766,888 B2 * | 7/2004 | Yasui et al. | 192/35 |
| 6,808,052 B2 * | 10/2004 | Kirkwood et al. | 192/35 |
| 2004/0118214 A1 * | 6/2004 | McDonald et al. | 73/756 |

FOREIGN PATENT DOCUMENTS

| | | |
|---|---|---|
| JP | 62-171530 | 7/1987 |
| JP | 62-185926 | 11/1987 |
| JP | 63-104119 | 7/1988 |
| JP | 01-158230 | 6/1999 |
| JP | 11-157355 | 6/1999 |
| JP | 11-159545 | 6/1999 |
| JP | 2001-311438 | 11/2001 |
| JP | 2003-285659 | 10/2003 |

* cited by examiner

Fig. 9
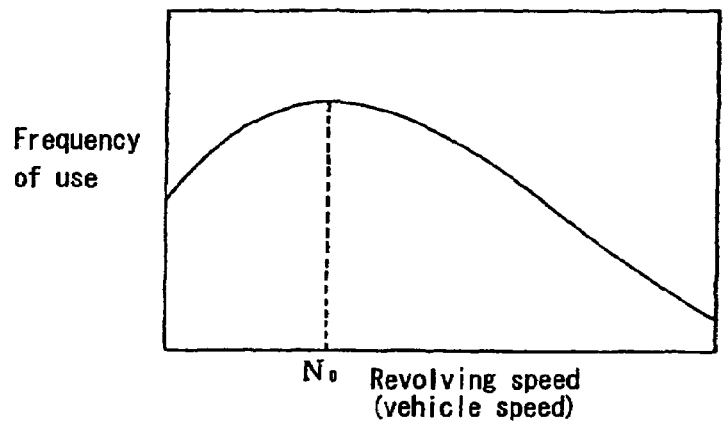
Fig. 10A (Heating mode)
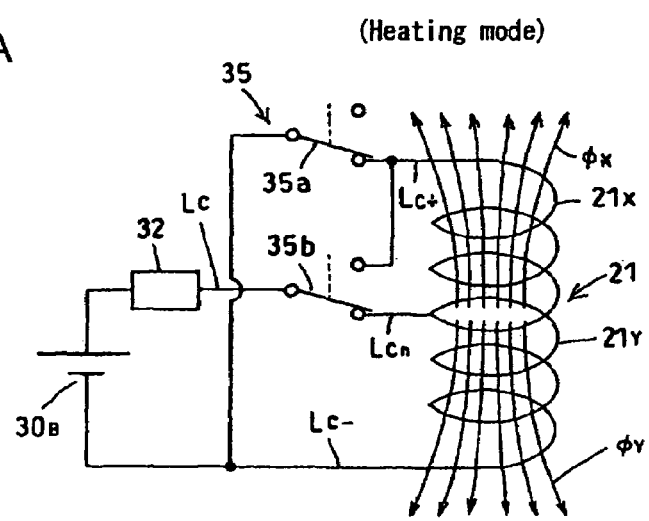
Fig. 10B (Drive mode)
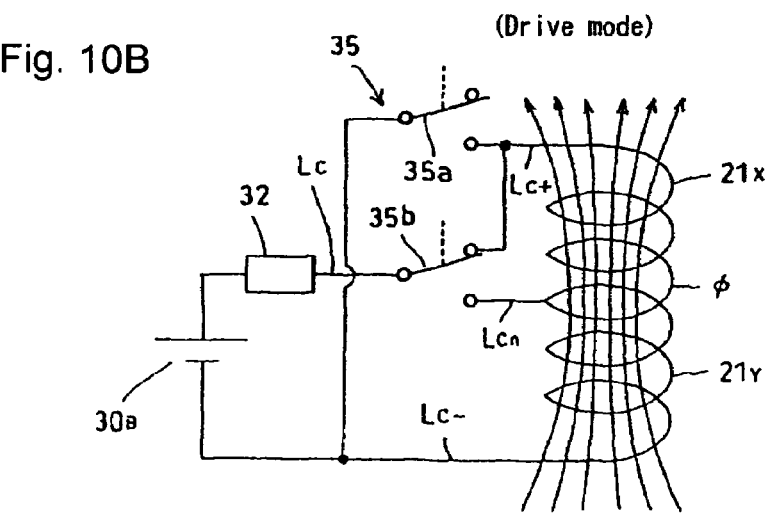

ROTATION TRANSMISSION DEVICE

TECHNICAL FIELD

This invention relates to a rotation transmission device mounted on a rotary shaft in e.g. a vehicle drivetrain for selectively transmitting the torque of the rotary shaft to another element.

BACKGROUND ART

Such rotation transmission devices include a two-way clutch type rotation transmission device comprising a roller clutch including an inner member, an outer ring and rollers disposed between the inner member and the outer ring, and an electromagnetic clutch. Torque is selectively transmitted between the inner member and the outer ring by selectively energizing the electromagnetic clutch and thus engaging the roller clutch. It is desired that the electromagnetic clutch consume less energy and produce less heat. It is also desirable that the electromagnetic clutch function as a heater in a low temperature environment. The invention disclosed in Patent document 1, which is titled "Method for controlling a rotation transmission device" proposes a rotation transmission device which satisfies these requirements.

Patent document 1 proposes to save energy and reduce heat build-up by intermittently applying current to the electromagnetic coil to keep the two-way clutch engaged, thereby keeping the vehicle in its 4WD mode. Current applied to the electromagnetic coil is controlled by pulse width modulation (PWM). The two-way clutch of Patent publication 1 is mounted in a transfer case of a 4WD vehicle of the front-engine, rear-drive layout. But such two-way clutches can be used for various other devices.

Patent document 2 discloses a method for controlling a 4WD vehicle using a rotation transmission device similar to the one disclosed in Patent publication 1. In this control method, if 2WD mode is selected while the ambient temperature is low and thus the oil temperature in the transfer case, as detected by a temperature sensor, is lower than a predetermined value, hub clutches or a front axle engaging means is locked to prevent vibrations of the vehicle due to repeated locking and unlocking of the two-way roller clutch.

In the control method based on pulse width modulation of Patent document 1, (a) when the two-way roller clutch is locked by energizing the electromagnetic coil, a relatively large current is applied to the electromagnetic coil to lock the roller clutch as quickly as possible, and (b) once the roller clutch locks, a relatively small current, i.e. current sufficient to produce a magnetic attraction force barely larger than the force of the switch spring from the electromagnetic clutch is applied to the electromagnetic coil. The current in either instance is determined according to the type of the clutch without taking into consideration the revolving speed of the rotary shaft when the roller clutch locks.

The inventors conducted studies on current values to be applied to the electromagnetic clutch and discovered that it is possible to further reduce power consumption if the current to be applied to the electromagnetic coil to lock the roller clutch is determined taking into consideration the revolving speed of the rotary shaft. None of prior proposals in the art of rotation transmission devices takes into consideration the influence of the revolving speed of the rotary shaft in determining the current to be applied to the electromagnetic coil to lock the roller clutch.

Patent document 2 discloses that the electromagnetic coil can be used as a heater by applying current to the electromagnetic coil while the ambient temperature is low. Irrespectively of whether the vehicle is traveling or at a stop, simply by energizing the electromagnetic coil, the coil can be used as a heater to heat lubricating oil and thus to instantly reduce its viscous resistance. But when the electromagnetic coil is energized, the coil also produces magnetic attraction force as an electromagnet. Thus, if a large current is applied to produce high calorie heat, the armature may be attracted to the rotor, causing untimely locking of the roller clutch. It is therefore desired to determine the current to be applied to the electromagnetic coil to an optimum value and to provide an electromagnet which can be used as a heater in a low-temperature environment without the possibility of untimely and undesired locking of the roller clutch.

In the above-described conventional rotation transmission device, because the two-way clutch and the electromagnetic clutch are mounted in an output member in a row, the output member has a large axial length. Further, because a nonmagnetic rotor guide is fitted in the output member so as not to be rotatable relative to the output member, and the rotor is fitted in the rotor guide to prevent leakage of the magnetic flux that flows through the rotor, the output member has a large diameter too. The entire rotation transmission device is thus heavy-weight.

In order to solve these problems, Patent document 3 proposes to divide the output member into an outer ring and an outer member made of a nonmagnetic material such as synthetic resin and rotationally fixed to the outer ring, provide the two-way clutch between the outer ring and the input member and support the rotor of the electromagnetic clutch on the outer member. By dividing the output member into the outer ring and the nonmagnetic outer member, it is possible to reduce the weight of the rotation transmission device.

The rotation transmission device disclosed in Patent document 3 uses a coupling means for coupling the outer ring to the outer member, such coupling means comprising a radial pin through which the outer ring and the outer member are coupled together so as to be nonrotatable and axially immovable relative to each other, or comprising flat surfaces of the outer ring and the outer member that abut each other, thereby preventing relative rotation between the outer ring and the outer member, and a snap ring engaged in a ring groove formed in the outer periphery of the outer ring to prevent axial movement of the outer member relative to the outer ring. But such a pin or snap ring may separate under centrifugal force when the outer ring rotates at high speed, and thus cannot couple the outer ring and outer member together with sufficiently high reliability. It may be conceivable to replace the pin with a screw or to caulk the edge of the open end of the hole into which the pin is inserted. But either solution is expensive.

Patent document 1: JP patent publication 11-159545A

Patent document 2: JP patent publication 11-157355A

Patent document 3: JP patent publication 2001-311438A

SUMMARY OF THE INVENTION

An object of the present invention is to provide a control system which can variably apply current to the electromagnetic coil of a rotation transmission device, and thereby selectively engage the roller clutch of the rotation transmission device under the magnetic force produced by the electromagnetic coil. Another object of the invention is to provide a rotation transmission device of which the electromagnetic coil is controlled based on the revolving speed of the rotary shaft to reduce power consumption and the size of the electromagnetic coil.

Still another object of the invention is to provide a rotation transmission device in which the output member is divided into an outer ring and a nonmagnetic cover, a two-way clutch is mounted between the outer ring and the input member, and an electromagnetic clutch for controlling the two-way clutch is mounted between the cover and the input member, and wherein the cover is coupled to the outer ring with high reliability.

According to the present invention, there is provided a control system for a rotation transmission device, comprising a rotation transmission device comprising a roller clutch unit including an inner member, an outer ring and rollers as engaging elements disposed between the inner member and the outer ring for selectively transmitting torque of a rotary shaft, and an electromagnetic clutch unit including an electromagnetic coil for selectively engaging and disengaging the roller clutch unit by electromagnetic force produced by the electromagnetic coil; a variable setting unit for variably applying current to the electromagnetic coil corresponding to the relative speed between the inner member and the outer ring when the roller clutch unit engages; and a control unit for controlling the variable setting unit.

From another aspect of the invention, there is provided a rotation transmission device comprising a roller clutch unit including an inner member, an outer ring and rollers as engaging elements disposed between the inner member and the outer ring for selectively transmitting torque of a rotary shaft, and an electromagnetic clutch unit including an electromagnetic coil for selectively engaging and disengaging the roller clutch unit by electromagnetic force produced by the electromagnetic coil, wherein when the roller clutch unit engages, a rated current corresponding to a rated revolving speed which is approximately a revolving speed of the rotary shaft when the electromagnetic coil is activated most frequently is applied to the electromagnetic coil, and wherein when the roller clutch unit engages, electric power is applied to the electromagnetic coil according to the relative revolving speed between the inner member and the outer ring so that the roller clutch is engageable by a current corresponding to the relative revolving speed.

With this arrangement, by variably applying current to the electromagnetic coil, it is possible to apply current corresponding to the revolving speed (relative revolving speed), so that it is possible to further save energy and reduce the size of the electromagnetic coil. Specifically, a rated current corresponding to a rated revolving speed which is approximately a revolving speed of the rotary shaft when the electromagnetic coil is activated most frequently is applied to the electromagnetic coil. In an actual situation, the revolving speed increases and decreases from the rated revolving speed. When the roller clutch is locked with such an increased or reduced revolving speed, the applied current is increased or reduced corresponding to the increased or reduced revolving speed. But the direction in which the applied current is increased or reduced is opposite to each other between the inner cam type and the outer cam type.

When the current applied to the electromagnetic coil is variably determined, the attraction force produced by the electromagnetic clutch is required to be only slightly greater than the force for keeping the clutch in the neutral position. But in order to engage the clutch as quickly as possible while minimizing the consumption of energy by the electromagnetic clutch, a current larger than the minimum current necessary to keep the clutch engaged is preferably applied to the electromagnetic clutch to engage the roller clutch. Specifically, a current that is greater than a reference current necessary to keep the roller clutch unit engaged by a factor of n which is greater than 1 is preferably applied to the electromagnetic coil. The current applied to the electromagnetic clutch is increased or reduced according to the revolving speed of the rotary shaft and depending upon whether the clutch is of the inner cam type or the outer cam type. Once the roller clutch engages, the current applied is reduced to the reference current. The reference current is also adjusted according to the revolving speed of the rotary shaft and depending upon whether the clutch is of the inner cam type or the outer cam type.

The applied current is controlled by applying a control signal from the control unit to the variable setting unit of the control system for the rotation transmission device. In order to variably control the applied current according to the revolving speed of the rotary shaft, the input and output shafts are provided with rotation sensors. But if there are rotation sensors provided for a different purpose, the signal therefrom may be sent to the control unit to detect the revolving speed. Based on the thus detected revolving speed, the control unit applies a control signal to the variable setting unit to variably apply current to the electromagnetic coil.

The variable setting unit increases the applied current if the clutch is of the outer cam type and reduces the applied current if the clutch is of the inner cam type with an increase in the revolving speed. When the roller clutch is engaged, in order to engage it quickly, the variable setting unit applies a current that is greater than the reference current by a factor of n.

According to the intended use of the rotation transmission device, how quickly the roller clutch should be engaged differs. If quick engagement is required, the value n (>1) should be increased. Once the roller clutch engages, the applied current is reduced to the reference current. The reference current is also adjusted according to the revolving speed of the rotary shaft and depending upon whether the clutch is of the inner cam type or the outer cam type.

In order to achieve the third object of the invention, there is provided a rotation transmission device wherein the cam surfaces are formed on an outer periphery of a large-diameter portion of the inner member, wherein the raceway is a cylindrical surface formed on the inner periphery of the outer ring, the cam surfaces and the cylindrical surface defining wedge-shaped spaces therebetween, the electromagnetic clutch unit including a rotor guide through which the rotor is coupled to the outer ring, the rotor guide being a nonmagnetic cover provided separately from the outer ring, wherein a protrusion is formed on one of opposed end surfaces of the outer ring and the cover and is engaged in a cutout formed in the other of the opposed end surfaces, and wherein a coupling means is provided radially inwardly of the portion where the protrusion engages in the cutout for axially inseparably coupling the cover to the outer ring.

The coupling means may comprise ring grooves formed in the inner periphery of the outer ring at an open end thereof and an inner periphery of the protrusion, and a radially elastically deformable snap ring engaged in the ring grooves. A discharge hole for lubricating oil is preferably defined between axially opposed end surfaces of the cutout and the protrusion to eliminate the need to form a separate oil discharge hole later and thus to reduce the cost.

Preferably, arcuate slits defining a circle are formed in a surface of the rotor opposed to and adapted to be attracted to the armature, and nonmagnetic elastic members are each received in one of the slits so as to protrude from the surface of the rotor. This prevents entry of foreign matter into the device through the slits, and also eliminates the need to separately provide a separation spring for biasing the armature away from the rotor. The rotation transmission device can thus be assembled more easily.

If foreign matter enters through the rotor into the gap between the armature and the rotor, it may become impossible to attract the armature to the rotor, which will in turn makes it impossible to engage the two-way clutch. Therefore, a seal is preferably provided radially inwardly of the rotor to prevent entry of foreign matter.

If the retainer for retaining the engaging elements is rotatably supported on a plate which is fitted on the input member and axially immovably fixed to the input member by a snap ring, the snap ring may separate under centrifugal force while the input member is rotating at high speed, thus making it impossible to axially retain the plate. In a preferred arrangement according to the present invention, the retainer has its inner periphery supported at its end on an outer periphery of a snap ring engaged in a ring groove formed in the outer periphery of the input member. With this arrangement, it is possible to prevent separation of the snap ring under centrifugal force, so that the retainer can be stably retained by the snap ring.

In the case of a rotation transmission device in which cam surfaces are formed on the outer periphery of the large-diameter portion of the input member, the switch spring is received in a recess formed in an end surface of the large-diameter portion. If the switch spring comes out of the recess, it cannot perform its expected function. Thus, preferably, a ring groove is formed in the radially inner surface of the radially outer wall of the recess, and the switch spring is mounted in the ring groove.

In a rotation transmission device in which a cylindrical surface is formed on the inner periphery of the outer ring as the output member and cam surfaces are formed on the outer periphery of the input member, the outer ring is preferably rotatably supported on the inner member through a bearing fitted in a bearing fitting surface formed on the inner periphery of the outer ring and having the same diameter as the cylindrical surface. With this arrangement, the inner periphery of the outer ring can be easily worked, so that it is possible to further reduce the cost.

With the control system for controlling the rotation transmission device including the roller clutch unit for selectively transmitting rotation through rollers, and the electromagnetic clutch unit for controlling the roller clutch unit with the electromagnetic force produced by the electromagnetic coil, the control system comprising the variable setting unit for variably applying current to the electromagnetic coil, and the control unit for controlling the variable setting unit, it is possible to variably apply current corresponding to the revolving speed of the rotary shaft to the electromagnetic coil, reduce power consumption of the rotation transmission device and variably determine the applied current.

The rotation transmission device according to the present invention comprises the roller clutch unit for selectively transmitting rotation through rollers, and the electromagnetic clutch unit for controlling the roller clutch unit with the electromagnetic force produced by the electromagnetic coil, wherein rated current corresponding to the rated revolving speed corresponding to the frequency of use can be applied to the electromagnetic coil, and current is variably applied to the electromagnetic coil according to the revolving speed of the rotary shaft. Thus, by determining the applied current to an optimum value corresponding to the revolving speed of the rotary shaft, it is possible to reduce the energy consumption and reduce the size of the electromagnetic coil, compared to a conventional rotation transmission device.

According to the rotation transmission device of the second invention, a protrusion is formed on one of opposed end surfaces of the outer ring and the cover and is engaged in a cutout formed in the other of the opposed end surfaces. The cover can thus be rotationally fixed to the outer ring.

By forming ring grooves in the inner periphery of the outer ring at an open end thereof and in the inner periphery of the protrusion, and engaging a radially elastically deformable snap ring in the ring grooves, it is possible to prevent the snap ring from coming out of the ring grooves under centrifugal force, so that the outer ring and the cover can be reliably coupled together.

BRIEF DESCRIPTION OF THE DRAWINGS

FIG. 9 shows the relationship between the frequency of use of the clutch and the revolving speed;

FIGS. 10A and 10B schematically show a mode switching circuit of the electromagnetic coil;

DETAILED DESCRIPTION OF THE INVENTION

Figure 1:
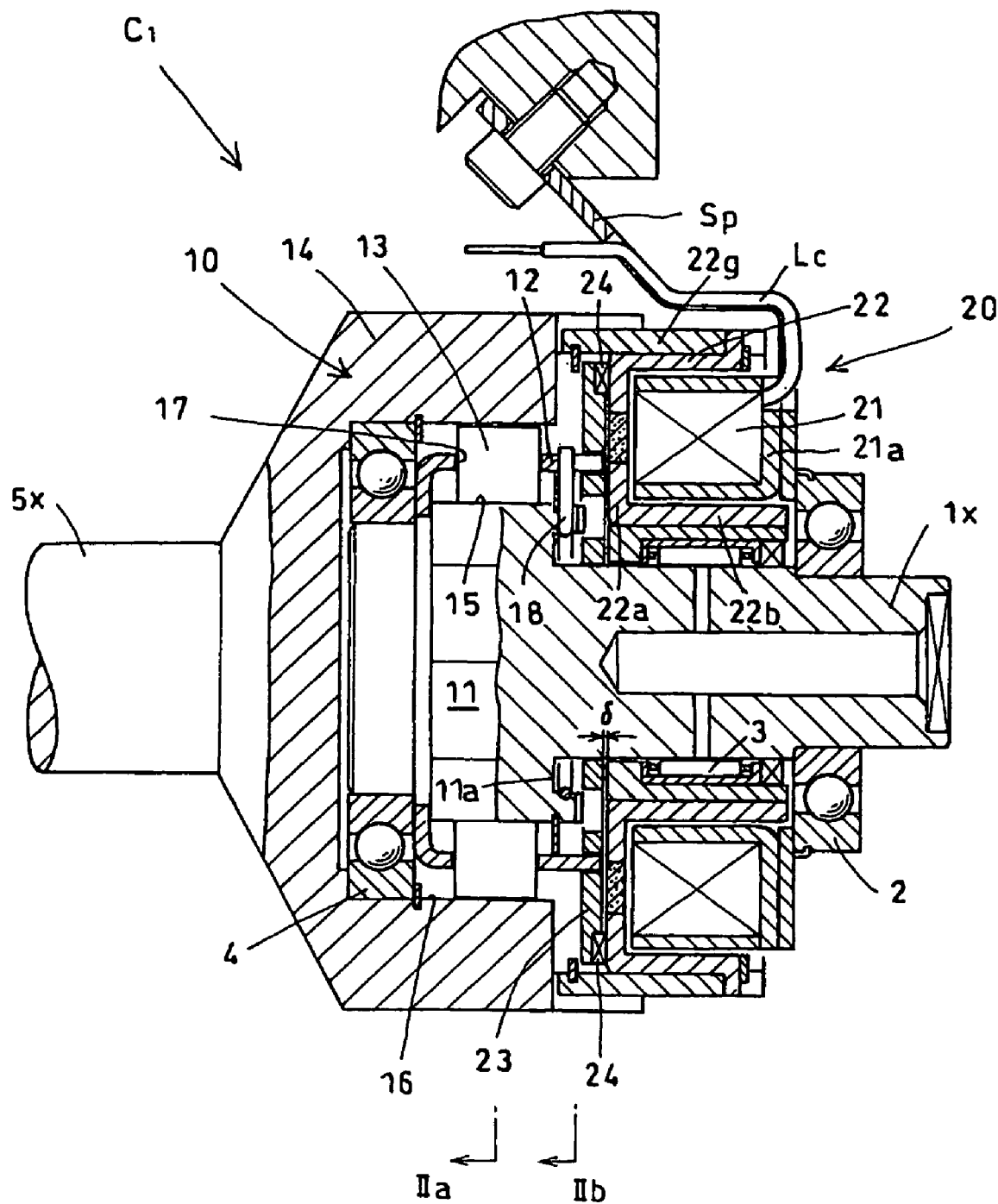
FIG. 1 is a sectional view of a rotation transmission device of the inner cam type according to a first embodiment of the present invention.

The embodiments are now described with reference to the drawings. FIG. 1 is a partial sectional view of the rotation transmission device of the first embodiment. In this embodiment, cam surfaces are formed on the outer periphery of an inner member. As shown, the rotation transmission device $C_1$ of this embodiment comprises a roller clutch unit 10 (two-way clutch) including a plurality of rollers 13 as engaging elements each received in one of pockets 17 formed in a retainer 12 so as to be circumferentially spaced apart from each other for transmitting torque from the inner member 11, which is provided at one end of the input shaft 1x, to an outer ring 14 provided at one end of an output shaft 5x, and an electromagnetic clutch unit 20 as an electromagnetic control means for electromagnetically engaging and disengaging the rollers 13 of the clutch unit 10. More specifically, as will be described below, the electromagnetic clutch unit 20 rotates the retainer 12 relative to the inner member 11 by selectively bringing an armature 23 into and out of frictional contact with a rotor 22, thereby selectively engaging and disengaging the rollers 13.

As shown in FIG. 1, the inner member 11 at the end of the input shaft 1x is disposed radially inwardly of and coaxially with the outer ring 14. The input shaft 1x, the output shaft 5x and other members of the roller clutch unit are supported by bearings 2, 3 and 4 so as to be rotatable relative to each other. Cam surfaces 15 are formed on the outer periphery of the inner member 11. A raceway 16 is formed on the inner periphery of the outer ring 14. The retainer 12 is disposed therebetween. The rollers 13, which are each received in one of the pockets 17, are disposed each on one of the cam surfaces 15 so as to be circumferentially equidistantly spaced apart from each other. By pushing the rollers 13 into respective wedge spaces defined by the cam surfaces 15 and the raceway 16, the clutch engages. The retainer 12 is elastically held in a neutral position relative to the inner member 11 where each roller 13 is disposed substantially at the center of the corresponding cam surface 15 by means of a switch spring 18.

The electromagnetic clutch unit is provided around the input shaft 1x so as to be disposed axially outwardly of and adjacent to the outer ring 14 of the roller clutch unit 10. The electromagnetic coil 21 is surrounded by a yoke 21a and fixed to a stationary member through a support member Sp. The rotor 22 and its rotor guide 22g surround the electromagnetic coil 21. The rotor 22 has a flange 22a disposed between the electromagnetic coil 21 and the armature 23. The rotor 22 is fixed to the rotor guide 22g, which is in turn fixed to the end surface of the outer ring 14. The rotor 22 comprises a radially outer cylindrical portion and a radially inner cylindrical portion 22b which is rotatably supported on the input shaft 1x through the bearing 3 and connected to the radially outer cylindrical portion through the flange 22a. The rotor has therefore a U-shaped longitudinal section. Electric power is supplied to the electromagnetic coil through a power supply line Lc.

Figure 2A:
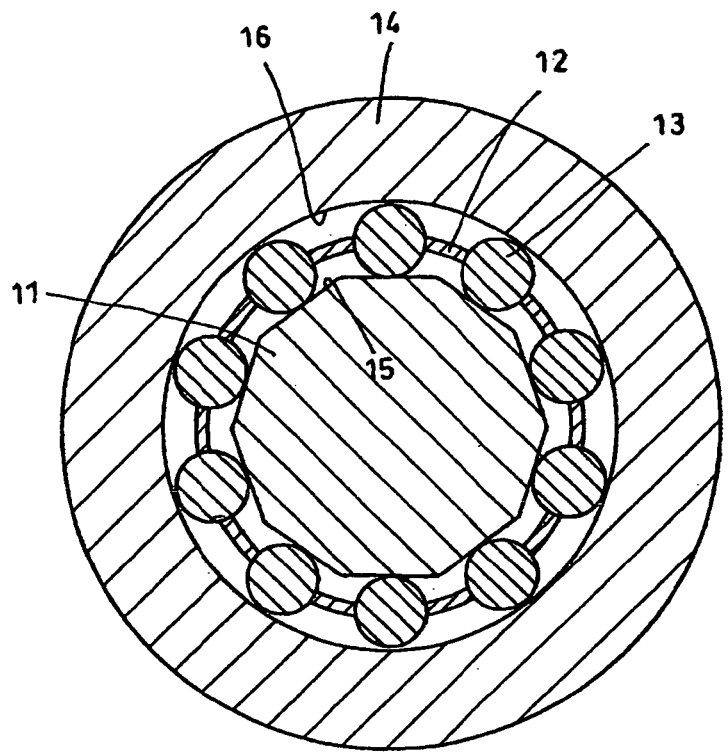
FIGS. 2A and 2B are sectional views taken along lines IIa-IIa and IIb-IIb of FIG. 1, respectively.
Figure 2B:
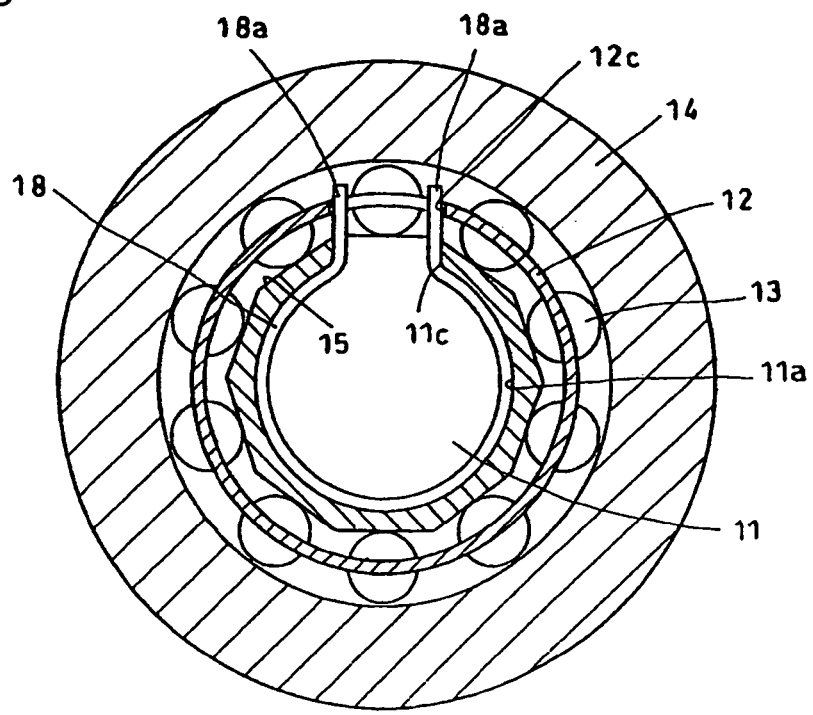

The armature 23 has holes (not shown) in which axial projections formed on the end surface of the retainer 12 are inserted, respectively, so as to be axially movable but rotationally fixed relative to the retainer 12. The switch spring 18 is disposed between the opposed end surfaces of the armature 23 and the inner member 11 to bias the rollers 13 each toward the center of one of the cam surfaces. The switch spring 18 is a ring-shaped elastic member and is received in a groove 11a defined by a shoulder formed on the inner member 11. The switch spring 18 has radially outwardly bent end portions 18a that are received in a cutout 11c formed in the wall defining the groove 11a (at its upper portion in FIG. 2B) and a cutout 12c formed in the retainer, thereby biasing the retainer toward the position where the cutouts 11c and 12c radially align with each other.

With the inner member 11 being rotated by the input shaft 1x, when the electromagnetic coil 21 is energized, the armature 23 is magnetically attracted to and brought into frictional contact with the flange 22a of the rotor 22, causing the armature 23 to be rotationally fixed to the outer ring 14. In this state, the inner member 11 rotates relative the retainer 12 while pushing one of the radially outwardly bent ends 18a by the edge of the cutout 11c. Thus, the rollers 3 are wedged into the rear narrow ends of the wedge-shaped spaces defined between the cam surfaces 15 and the raceway 16 with respect to the rotational direction of the inner member 11. Torque of the inner member 11 is thus transmitted through the rollers 13 to the outer ring 14 and thus to the output shaft 5x.

When the electromagnetic coil 21 is deenergized, the armature 23 is moved away and disengages from the rotor 22 by a separation spring 24. The retainer 12, which is rotationally fixed to the armature 23, is thus pushed back to its neutral position where the rollers 13 are each on the center of the corresponding cam surface by the switch spring 18. The rollers 13 thus disengage from the outer ring 14.

Figure 3:
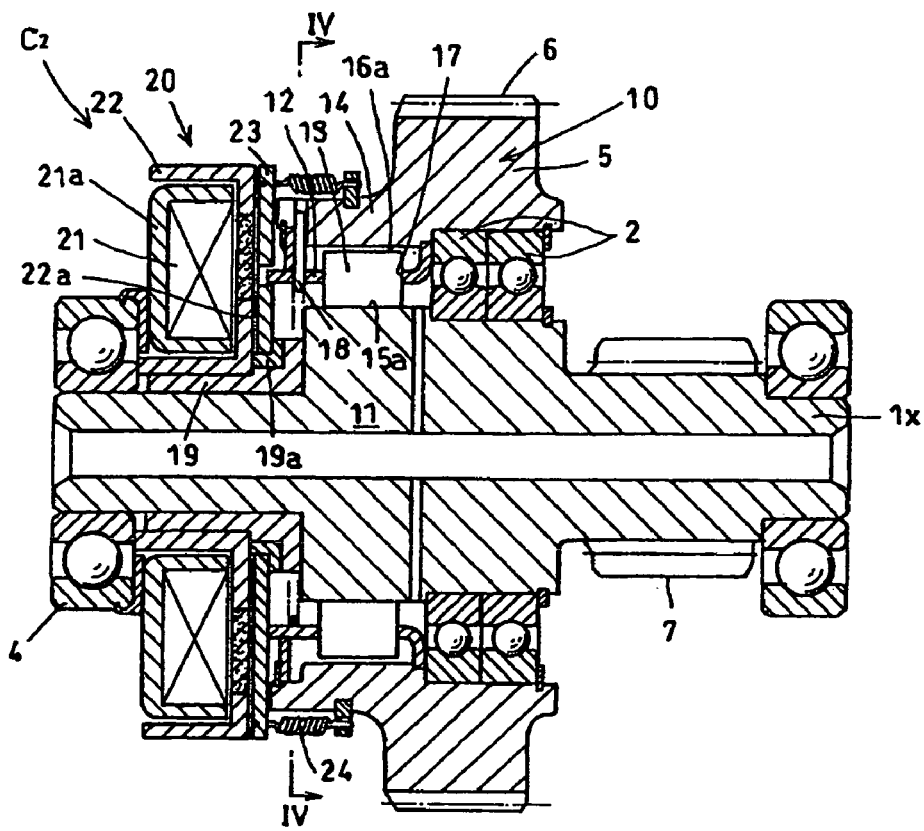
FIG. 3 is a sectional view of a rotation transmission device of the outer cam type according to a second embodiment of the present invention.
Figure 4:
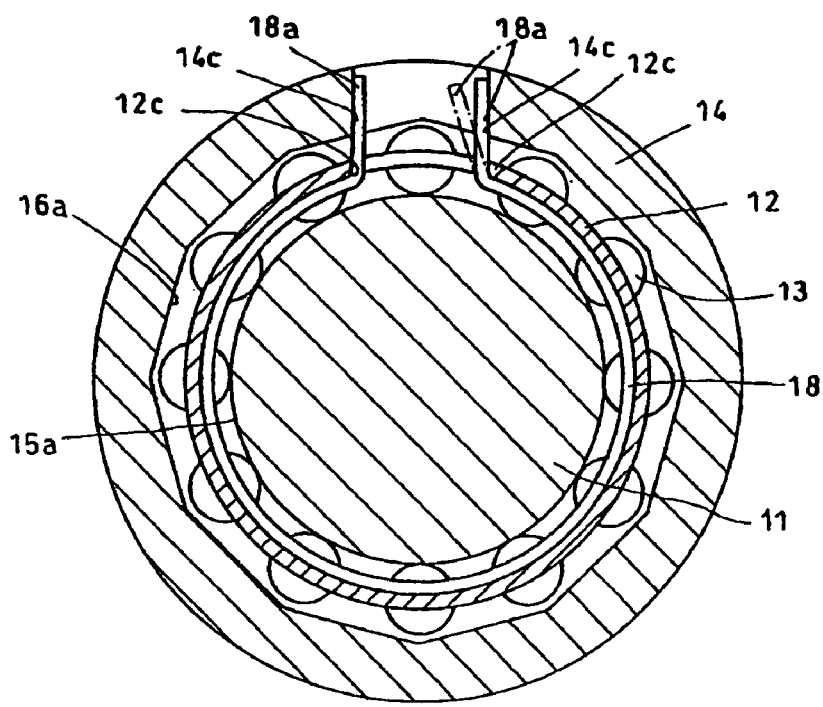
FIG. 4 is a sectional view taken along line IV-IV of FIG. 3.

FIGS. 3 and 4 show the rotation transmission device $C_2$ of the second embodiment. In this embodiment, cam surfaces are formed on the inner periphery of the outer ring. Elements identical to those of the first embodiment are denoted by identical numerals and their description is omitted. As shown, as in the first embodiment, the rotation transmission device $C_2$ comprises a roller clutch unit 10 and an electromagnetic clutch unit 20. The electromagnetic clutch unit 20 is provided axially outwardly of and adjacent to the outer ring of the roller clutch unit 10. The roller clutch unit 10 includes an inner member 11 which is a large-diameter portion of an input shaft 1x. The inner member 11 has a radially outer raceway 15a. The outer ring 14 is provided around the raceway 15a and is formed with cam surfaces 16a on its inner periphery.

A retainer 12 having a plurality of pockets 17 is disposed between the inner member 11 and the outer ring 14. As many rollers 13 as the number of cam surfaces 16a are respectively received in the pockets 17 and circumferentially equidistantly spaced apart from each other by the retainer 12. By pushing each roller 13 into one of the narrow circumferential ends of the wedge-shaped spaces defined between the cam surfaces 16a and the raceway 15a, the clutch is locked. The retainer 12 is connected to the outer ring 14 through a switch spring 18 so as to be rotatable relative to the outer ring 14. The switch spring 18 biases the retainer 12 relative to the outer ring 14 toward a neutral position where each roller 13 is received in a recess defined between a pair of adjacent cam surfaces 16a.

As shown in FIG. 3, the switch spring 18 is a ring-shaped member provided along the inner periphery of the retainer 12 near its end adjacent to the electromagnetic clutch unit. The switch spring 18 has radially outwardly bent end portions 18a that are received in cutouts 12c and 14c formed in the retainer 12 and the outer ring 14, respectively, thereby biasing the retainer 12 toward a position where the cutouts 12c and 14c radially align with each other. The outer ring 14 has an integral extension 5 at its end remote from the electromagnetic clutch unit 20. Bearings 2 are disposed between the inner periphery of the extension 5 and a medium diameter portion of the input shaft 1x adjacent the raceway 15a, thereby supporting the outer ring 4 so as to be rotatable relative to the input shaft 1x. The rotation transmission device of this embodiment further includes a gear 6 through which torque is transferred to an external element from the outer ring 14, and a gear 7 through which torque is transferred to the input shaft 1x from an external member.

The electromagnetic clutch unit 20 comprises a rotor 22 fixed to the input shaft 1x through a sleeve 19 and having a flange 22a, an electromagnetic coil 21 disposed on one side of the flange 22a, and an armature 23 disposed on the other side of the flange 22a. The armature 23 is mounted on the sleeve 19 through a friction-reducing member 19a so as to be rotatable and axially movable within a predetermined distance relative to the sleeve 19. The armature 23 is formed with a plurality of holes in which projections formed on the end surface of the retainer 12 are respectively inserted. The armature 23 is thus rotationally fixed to the retainer 12. The armature 23 is pulled toward roller clutch unit 10 by a separation spring 24 secured to the outer ring 14.

When the electromagnetic coil 21 is energized, the armature 23, which is axially movable relative to the retainer 12, is brought into frictional contact with the flange 22a of the rotor 22. Because the rotor 22 is fixed to the input shaft 1x, while the armature 23 is rotationally fixed to the retainer 12, with the rotation of the input shaft 1x, the retainer 12 rotates relative to the outer ring 14 against the force of the switch spring 18, thereby pushing each roller 13 into one of the narrow ends of the wedge-shaped space. Torque is thus transferred from the inner member 11 to the outer ring 14. When the electromagnetic coil 21 is deenergized, the armature 23 disengages from the rotor 22, so that the retainer 12 is returned to its neutral position under the biasing force of the switch spring 18. The rollers 13 thus disengage the inner member 11 and the outer ring 14 from each other.

Figure 5:
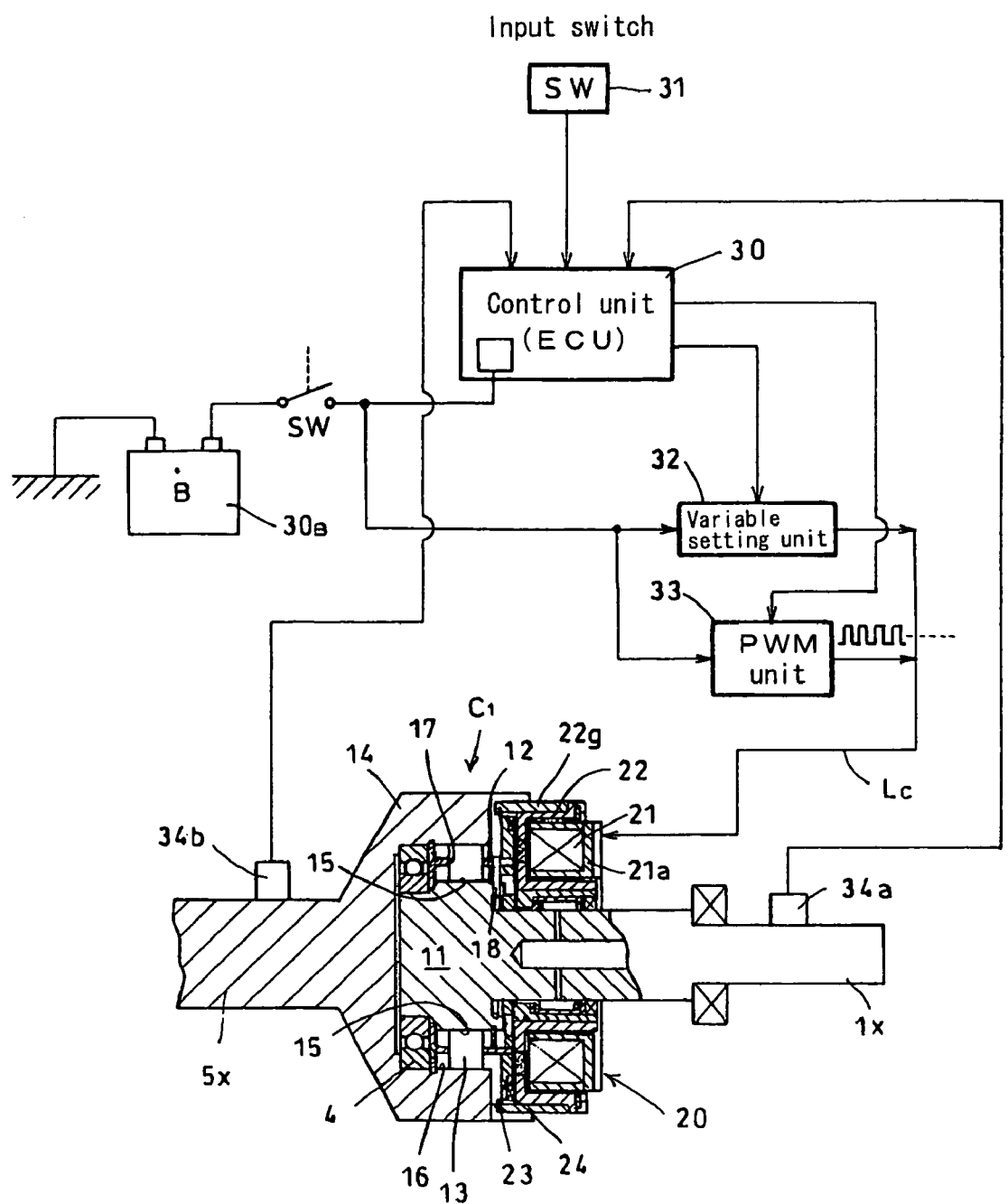
FIG. 5 is a block diagram of a control circuit for a rotation transmission device.

The force that acts on the rollers 13 of the first embodiment (inner cam type) is opposite in direction to the force that acts on the rollers 13 of the second embodiment (outer cam type) when the respective rollers 13 engage. FIG. 5 shows a control circuit that can be used for either of the inner cam type and outer cam type and that can variably and optimally set the current, thereby reducing the power consumption compared to conventional pulse width modulation (PWM) control.

The control circuit of FIG. 5 includes an electronic control unit (ECU) 30 in the form of a microcomputer which receives signals indicating the revolving speeds of the input shaft 1x and the output shaft 5x from rotation sensors 34a and 34b mounted on the shafts 1x and 5x, respectively, and based on these signals, controls the current applied to the electromagnetic coil 21 from the vehicle battery (power source) $30_B$ through a variable setting unit 32 or a PWM unit 33. The variable setting unit 32 sets the current to the electromagnetic coil 21, when the clutch is engaged, to an optimum value based on the revolving speeds of the input shaft 1x and the output shaft 5x. After the electromagnetic clutch unit 20 has engaged, the PWM unit 33 intermittently applies current to the electromagnetic coil 21 by PWM control to keep the clutch unit 20 engaged. The control circuit further includes an input switch SW31 for selectively turning on and off a mode switch 35 to be described below.

The control circuit operates differently for the inner cam type and the outer cam type to control the engagement of the electromagnetic clutch unit 20. In the case of the inner clutch type shown in FIG. 1, while the input shaft 1x, on which the cam surfaces 15 are formed, is rotating at a high speed, the rollers 13 are moved radially outwardly and pressed against the raceway 16 of the outer ring 14 under centrifugal force. The frictional force therebetween therefore serves to slow down the revolving speed of the rollers 13 about the axis of the input shaft, thus assisting in the engagement of the clutch.

In the case of the outer cam type shown in FIG. 3, while the outer ring 14, on which the cam surfaces 16a are formed, is rotating at a high speed, the rollers 13 are moved radially outwardly under centrifugal force as in the case with the inner cam type. In this case, however, the rollers 13 are received in the recesses defined between the adjacent cam surfaces 16a. In order to push the rollers 13 into the narrow ends of the wedge-shaped spaces defined between the cam surfaces 16a and the raceway 15a of the inner member 11, an additional force has to be applied to the retainer sufficient to wedge the rollers 13 into the narrow ends of the wedge-shaped spaces against the centrifugal force and the frictional force between the rollers and the cam surfaces 16a. Thus, the centrifugal force and the frictional force serve to inhibit the engagement of the clutch.

Figure 6A:
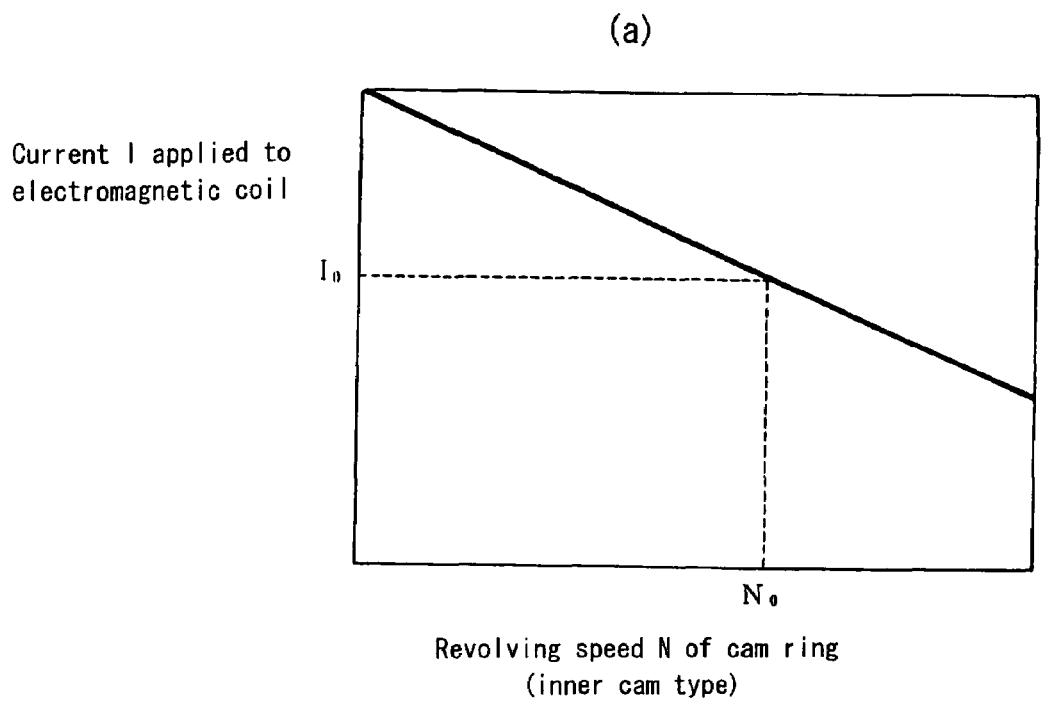
FIG. 6A shows how the rotation transmission device of the first embodiment is controlled (shows the relationship between the revolving speed of the cam ring of the inner cam type and the current applied to the electromagnetic coil)
Figure 6B:
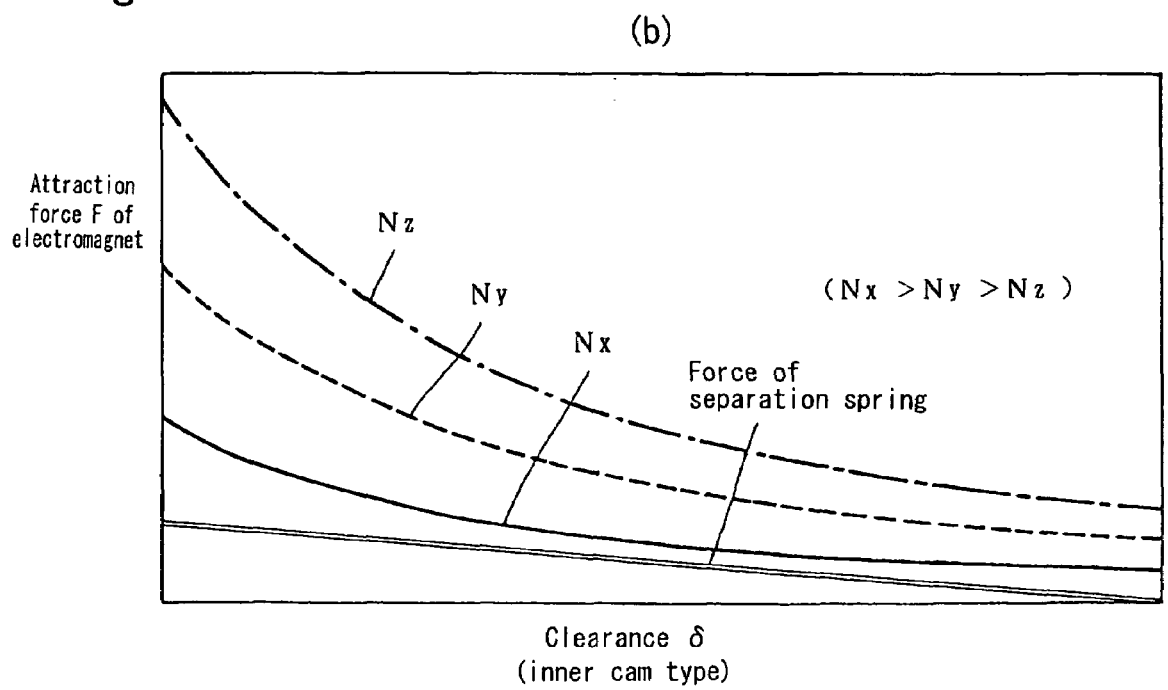
FIG. 6B shows how the rotation transmission device of the first embodiment is controlled (shows the relationship between the clearance between the rotor and the armature and the attraction force necessary to engage the clutch with revolving speeds $N_X$, $N_Y$ and $N_Z$ of the cam ring of the inner cam type as parameters)

Thus, the inner cam type and the outer cam type operate differently from each other when the inner member and the outer ring engage with each other through the rollers with the inner member 11 or the outer ring 14 rotating at a high speed. For the inner cam type first, FIG. 6A shows the current I variably applied to the electromagnetic coil 21 by the variable setting unit 32 according to the revolving speed N of the inner member 11, and FIG. 6B shows the relationship between the clearance δ between the rotor 22 and the armature 23 determined based on the variably set current I and the magnetic attraction force F necessary to engage the clutch with revolving speeds $N_X$, $N_Y$ and $N_Z$ as parameters. In the figures and in the following description, the inner member 11 is referred to as the cam ring. Symbols $N_0$ and $I_0$ in FIG. 6A indicate the rated revolving speed and the rated current, respectively, which are described later.

For the inner cam type, because the frictional resistance between the rollers 13 and the outer ring 14 serves to assist in engaging the clutch, it is possible, as shown in FIG. 6A, to reduce the current applied to the electromagnetic coil 21 and thus the magnetic attraction force F necessary to engage the clutch with an increase in the revolving speed N of the cam ring. As shown in FIG. 6B, while the clearance δ is relatively large, it is necessary to produce magnetic attraction force F that is larger than the force of the separation spring 24 for keeping the rotor 22 and the armature 23 spaced from each other, irrespective of the revolving speed N. After the clearance δ has become zero, i.e. after the armature 23 has been attracted to the rotor 22, when the revolving speed of the cam ring changes from $N_Z$ to $N_Y$ and then to $N_X$ ($N_X$>$N_Y$>$N_Z$), the necessary magnetic attraction force F decreases. This indicates that it is possible to reduce the applied current with an increase in the revolving speed N. Thus, after the electromagnetic clutch unit 20 has engaged, the current applied to keep the clutch unit 20 engaged is reduced with an increase in the revolving speed N.

Figure 7A:
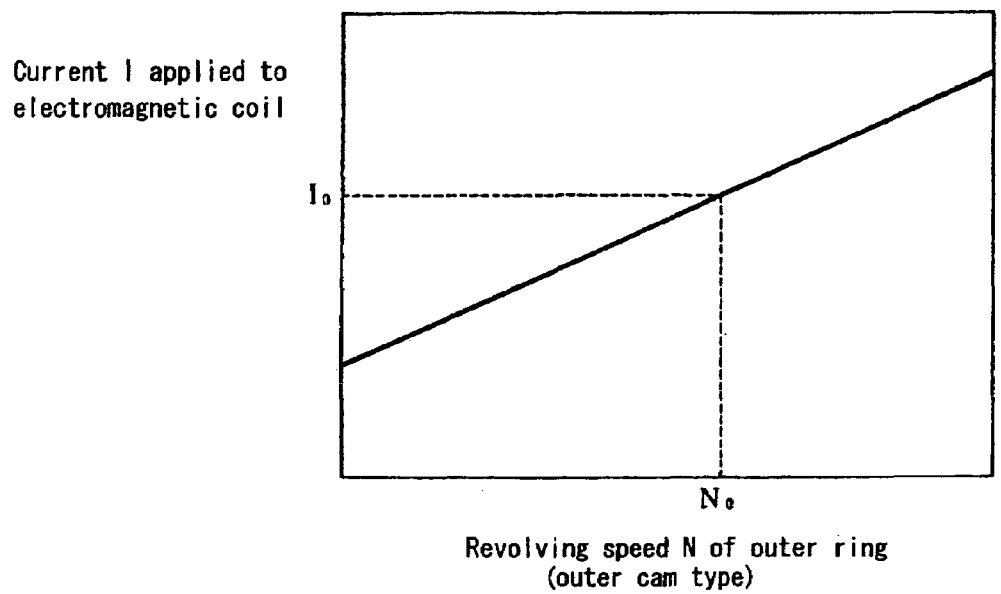
FIG. 7A shows how the rotation transmission device of the second embodiment is controlled (shows the relationship between the revolving speed of the outer ring of the outer cam type and the current applied to the electromagnetic coil)
Figure 7B:
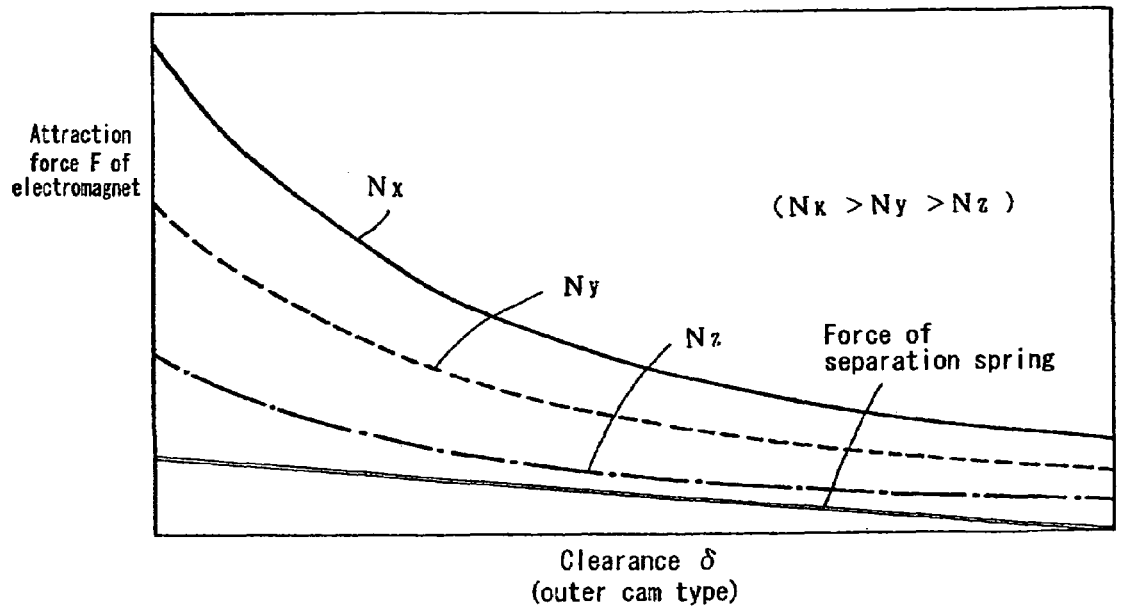
FIG. 7B shows how the rotation transmission device of the second embodiment is controlled (shows the relationship between the clearance between the rotor and the armature and the attraction force necessary to engage the clutch with revolving speeds $N_X$, $N_Y$ and $N_Z$ of the outer ring of the outer cam type as parameters)

FIGS. 7A and 7B correspond to FIGS. 6A and 6B, respectively, for the outer cam type except that the horizontal axis in FIG. 7A indicates not the revolving speed of the cam ring but the revolving speed N of the outer ring. As shown in FIG. 7B, with an increase in revolving speed of the outer ring 14, greater centrifugal force acts on the rollers 13. Before the clutch engages, the rollers 13 are received in the recesses defined between the adjacent cam surfaces 16a. Thus, the current I necessary to be applied to the electromagnetic coil 21 to engage the clutch is large. Also as shown in FIG. 7B, while the clearance δ is relatively large, it is necessary to produce magnetic attraction force F that is larger than the force of the separation spring 24 for keeping the rotor 22 and the armature 23 spaced from each other (by pulling the armature 23 away from the rotor 22), irrespective of the revolving speed N. After the clearance δ has become zero, i.e. after the armature 23 has been attracted to the rotor 22, the necessary magnetic attraction force F and thus the current I applied increase with an increase in the revolving speed N of the outer ring 14.

Thus, both for the inner cam type and the outer cam type, by variably setting the current I applied to the electromagnetic coil 21 to a minimum value necessary to engage the clutch based on the revolving speed by means of the variable setting unit 32, it is possible to optimally control the applied current. In the PWM control disclosed in Patent document 1, the current applied to the electromagnetic coil is controlled by PWM irrespectively of the revolving speed so that the frictional torque of the armature is greater than the torque for keeping the clutch in the neutral position. Thus, in this PWM control, the applied current is controlled to a maximum value with reference to the expected maximum value of the revolving speed N of the inner member or the outer ring.

In contrast, according to the present invention, the current I applied to the electromagnetic coil 21 is variably controlled based on the revolving speed N and depending on whether the rotation transmission device is of the inner cam type or the outer cam type. This makes it possible to reduce the applied current in the revolving speed range where an unnecessarily large current was applied in the prior art, which in turn makes it possible to further save energy and reduce the size of the electromagnetic coil 21 compared to the conventional control arrangement. In order to control the applied current based on the revolving speed N, the control unit 30 receives signals from the rotation sensors 34a and 34b mounted on the input and output shafts 1x and 5x, respectively, and controls the applied current based on such signals.

For either of the inner cam type and the outer cam type, the applied current is preferably controlled such that the response of the clutch improves simultaneously. In order to improve the response of the clutch, it is necessary to shorten the duration of each of the steps when the clutch engages, i.e. the steps of (1) applying current to the electromagnetic coil 21, (2) attracting the armature 23, which is spaced from the rotor 22 through the clearance δ, to the rotor 22, and (3) producing torque necessary to push the rollers 13 into narrow ends of the wedge-shaped spaces defined between the inner member 11 and the outer ring 14 by the contact between the rotor and the armature.

Figure 8A:
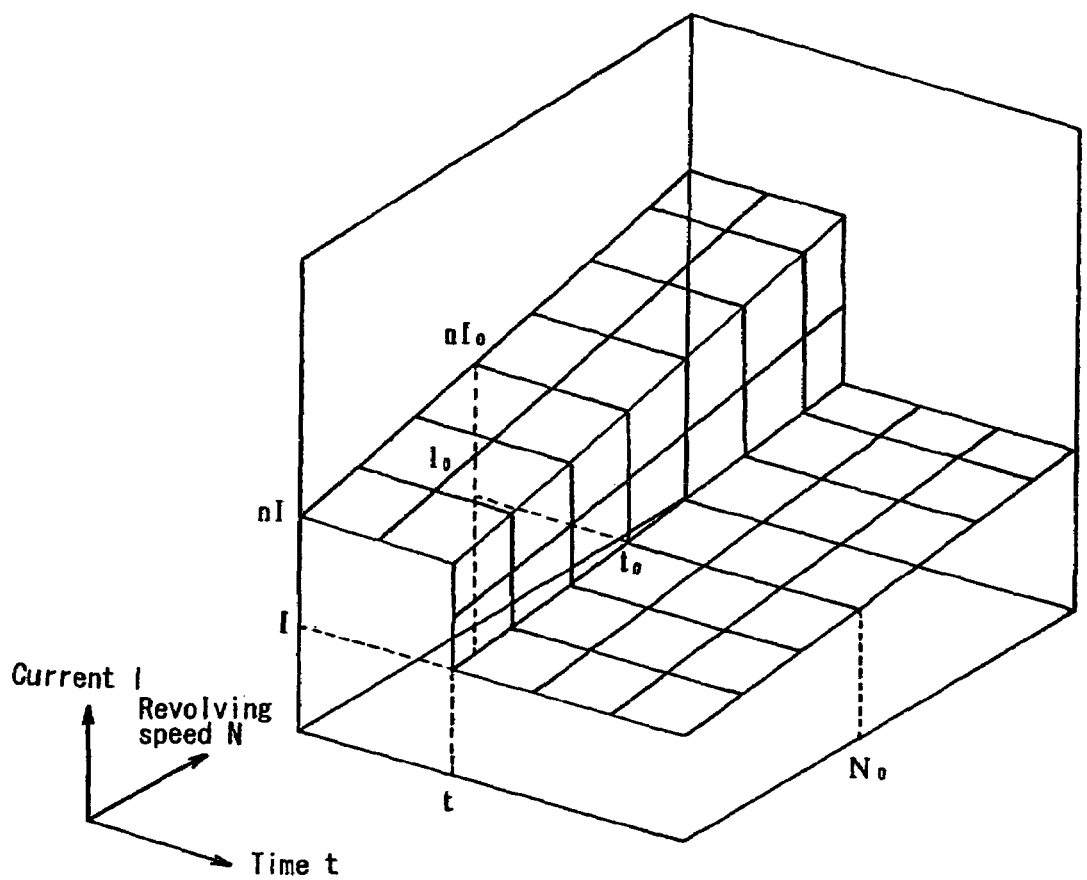
FIG. 8A shows how the rotation transmission device of the second embodiment is controlled (shows the relationship between the revolving speed N of the outer ring of the outer cam type, current and time)
Figure 8B:
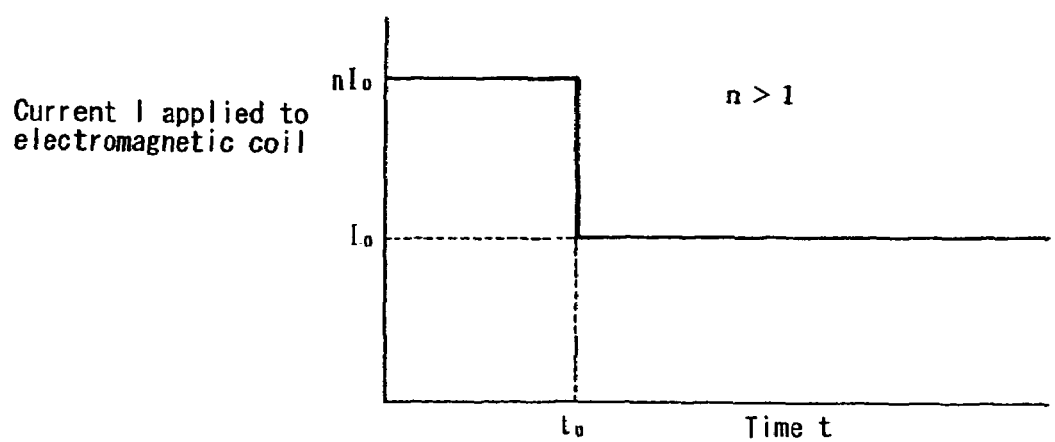
FIG. 8B shows how the device of FIG. 3 is controlled at a rated revolving speed $N_0$ (shows the relationship between the revolving speed N of the outer ring of the outer cam type, current and time)

FIGS. 8A and 8B are graphs showing a control method for shortening the durations of the steps (1) and (2). FIG. 8A shows, three-dimensionally, the relationship between the applied current I, the revolving speed N and time t. FIG. 8B shows, two-dimensionally, the relationship between the applied current $I_0$ and time $t_0$ when the revolving speed is a predetermined value, e.g. the rated value $N_0$. These graphs show the control method for the outer cam type.

When the control for improving the response of the clutch is carried out, the applied current is variably controlled to engage the clutch. Provided the revolving speed N of the shaft is currently at the rated revolving speed of $N_0$, the control for improving the response of the clutch is carried out by means of the variable setting unit 32 by applying current $nI_0$ that is greater by a factor of n (n>1) than the reference current $N_0$, which is a minimum value necessary to engage the clutch when the shaft is rotating at $N_0$, during the period from when the electromagnetic coil 21 is energized until the clutch engages (time $t_0$), and after the clutch has engaged at time $t_0$, reducing the applied current to the reference current $I_0$. If the revolving speed N is not equal to the rated revolving speed $N_0$, this control is carried out in the same manner based on the current revolving speed N as shown in FIG. 8A.

The control unit 30 compares the signals from the rotation sensors 34a and 34b. If they are identical or substantially identical (to a predetermined degree) to each other, the control unit 30 determines that the electromagnetic clutch unit 20 has completely engaged, and reduces the applied current from $nI_0$ to $I_0$ through the variable setting unit 32. After the applied current has been reduced to $I_0$, the PWM unit 33 performs the PWM control to intermittently apply current.

The rated revolving speed $N_0$ is determined taking into consideration the factors mentioned below, and the size of the electromagnetic coil 21 is determined based on the current value $I_0$ corresponding to the rated revolving speed $N_0$. This makes it possible to minimize the size of the electromagnetic coil 21. FIG. 9 shows the relationship between the revolving speed N and the frequency of use of the clutch (the number of times the clutch is turned on and off) when a clutch of the outer cam type as the rotation transmission device is mounted on the drivetrain of a vehicle. The rated revolving speed $N_0$ is the revolving speed at which the frequency of use of the clutch is at a maximum. In FIG. 9, the rated revolving speed $N_0$ is a speed which is lower than the average of the maximum and minimum revolving speeds. The size of the electromagnetic coil is determined based on the rated revolving speed.

Depending on the intended use, the rotation transmission device is used in a high revolving speed range or in a low revolving speed range. The rated revolving speed is determined taking into consideration such intended use, and the size of the electromagnetic coil is determined based on the rated revolving speed. But in actual use conditions, as shown in FIG. 8A, the clutch may be engaged while the revolving speed is lower or higher than the rated revolving speed $N_0$. If the clutch engages while the revolving speed is higher than $N_0$, a relatively large current is applied to the coil. But at such a high revolving speed, the clutch is engaged less or least frequently, so that this will have no significant influence on the life span and durability of the electromagnetic coil. Such use is appropriate because the size of the electromagnetic coil is determined taking into consideration the frequency of use.

In order to shorten the time until the clutch completely engages ($t_0$), current is applied to the electromagnetic coil 21 which is larger by a factor of n (n>1) than the current $I_0$ necessary to maintain the clutch engaged. The current $I_0$ is a value after the engagement of the clutch when the inner member 11 or the outer ring 14 is rotating at a revolving speed N when it engages, and changes with the actual revolving speed N.

FIGS. 10A and 10B schematically show a mode switching circuit including the mode switch 35 for the electromagnetic coil 21 provided in a power supply line Lc. As mentioned above, the mode switching circuit can be used as a heater for producing heat in a low temperature environment to prevent erroneous engagement of the clutch. FIG. 10A shows a heating mode. FIG. 10B shows the electromagnetic coil 21 used in the drive mode. The mode switching circuit includes a central line Lcn connected to the center of the electromagnetic coil 21 to divide the coil into two portions $21_X$ and $21_Y$ so that the heating mode and the drive mode can be changed over by the mode switch 35. It is also possible to prevent erroneous engagement.

The mode switch 35 has two switches 35a and 35b in lines Lc+ and Lcn connected to the positive side and the central position of the power supply line Lc. The line Lc+ is bifurcated so as to be connectable to one of the two switches 35a and 35b. Line Lc− is grounded. The two switches 35a and 35b are provided at least downstream of the variable setting unit 32. While not shown, if the PWM unit 33 is provided, they are preferably provided downstream of the PWM unit too. While not shown, the modes are changed over by applying control signals to the two switches 35a and 35b from the control unit 30. Numeral $30_B$ is the vehicle battery (power source).

If the heating mode of FIG. 10A is selected when the vehicle is started at low temperature, because the switch 35a of the mode switch 35 is connected to Lc+ and the switch 35b is connected to Lcn, the current from the power source $30_B$ flows partially through the coil $21_X$ and partially through the coil $21_Y$. Thus, the magnetic fluxes $\phi_X$ and $\phi_Y$ produced in the coils $21_X$ and $21_Y$ are opposite in direction from each other and cancel each other, so that the electromagnetic coil 21 produces no magnetic attraction and produces only heat as a heater. If the drive mode in FIG. 10B is selected, the switch 35a is separated from line Lc+ and the switch 35b is connected to line Lc+ (and separated from line Lcn), so that the two electromagnetic coils $21_X$ and $21_Y$ act as the single electromagnetic coil 21 to produce magnetic flux $\phi$, which in turn produces magnetic attraction.

By providing such a mode switching circuit in the power supply line Lc through which current is applied to the electromagnetic coil 21, it is possible to change over between the heating mode and the drive mode when the vehicle is started at low temperature so as to instantaneously reduce the viscous resistance at low temperature, thereby normally activating the electromagnetic clutch unit 20.

Figure 11:
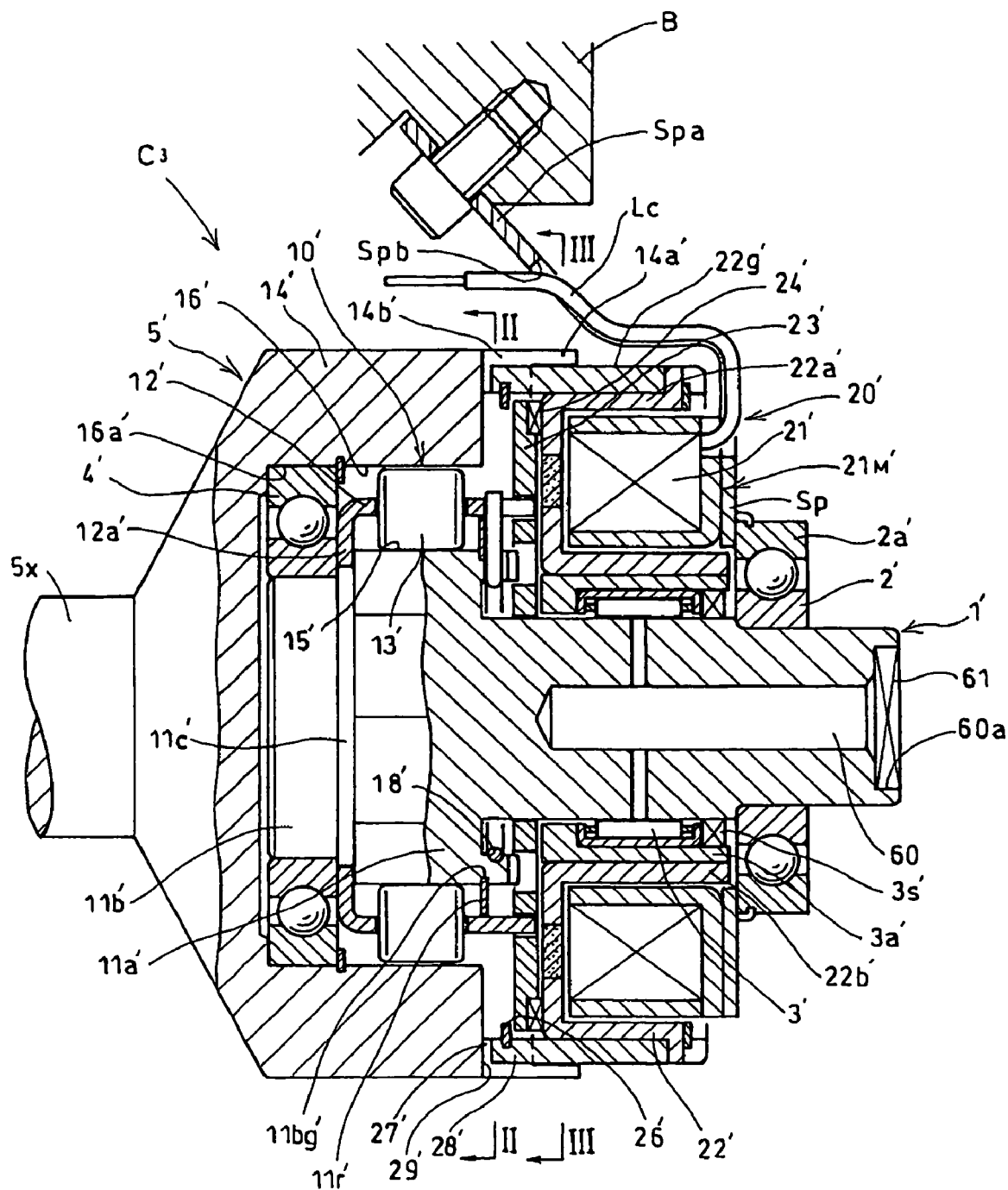
FIG. 11 is a vertical sectional front view of a rotation transmission device according to a third embodiment of the present invention.

FIG. 11 shows a partial sectional view of the rotation transmission device of the third embodiment, which is of the inner cam type. The rotation transmission device of this embodiment is substantially identical in structure to the embodiment of FIG. 1. But in this embodiment, details of the rotation transmission device are improved, which are missing in FIG. 1 and its description. Specifically, in this embodiment, the output member comprises an outer ring and a separate nonmagnetic cover to reduce the weight of the rotation transmission device and to provide more secure coupling of the cover to the outer ring. In this embodiment, some of the elements identical or corresponding to elements of FIG. 1 are identified by different names and by the same numerals with a prime (') added thereto. (The names used in the embodiment of FIG. 1 are shown in brackets.)

Figure 16:
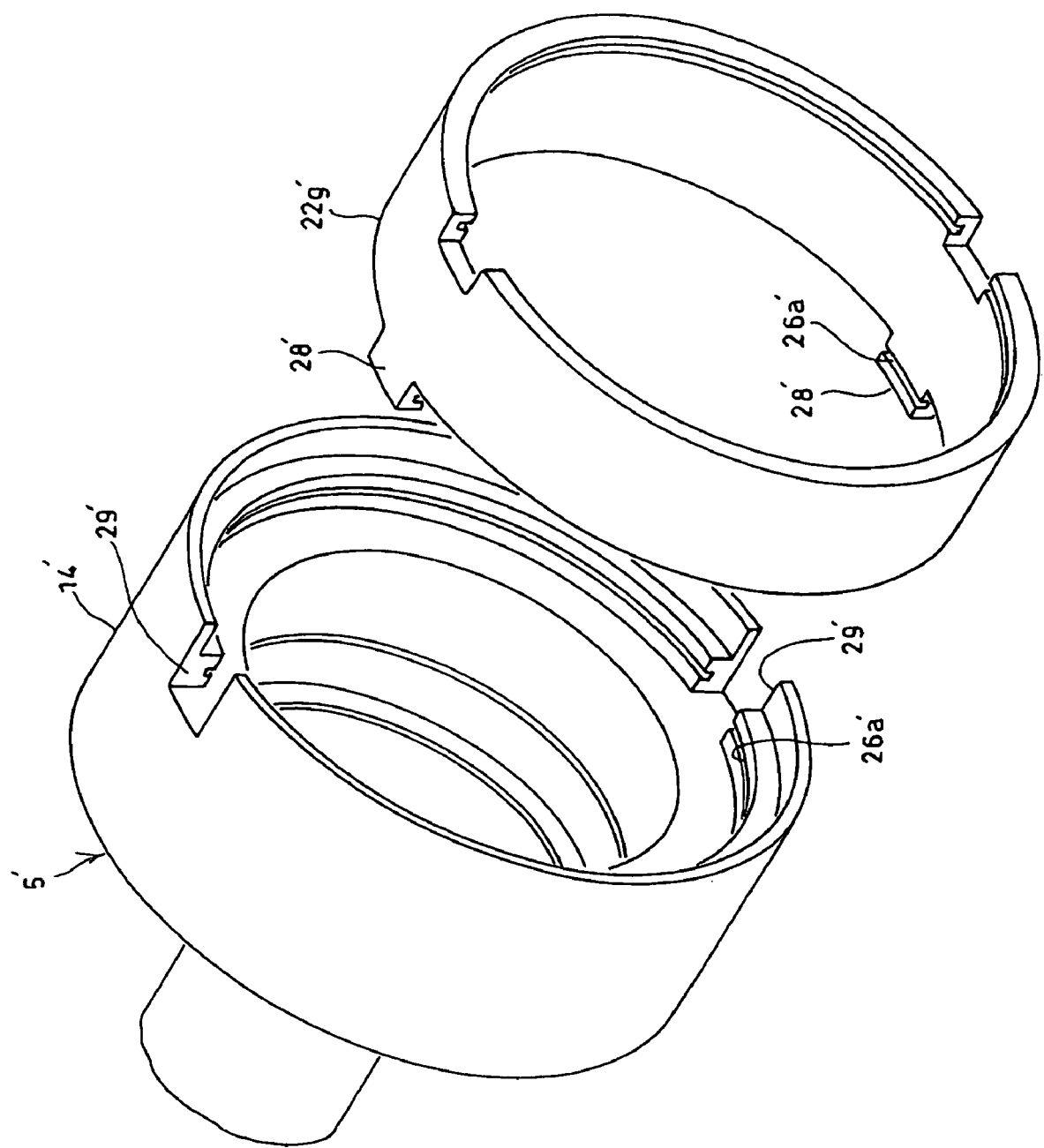
FIG. 16 is an exploded perspective view of an output member and a cover of the rotation transmission device of FIG. 11.

As shown in FIG. 11, the input member 1' includes a large-diameter portion 11a' (inner member 11) having at its front end a stepped shaft portion 11b'. The output member 5' (output shaft 5x) is provided around the large-diameter portion 11a'. As shown in FIGS. 11 and 16, the output member 5' comprises an outer ring 14' (outer ring 14) and a separate cover 22g' (rotor guide 22g). The outer ring 14' is made of a metal and has a bearing fitting surface 16a' on its inner periphery. A bearing 4' (bearing 4) is disposed between the bearing fitting surface 16a' and the shaft portion 11b' so that the input member 1' and the outer ring 14' are rotatable relative to each other.

Figure 14:
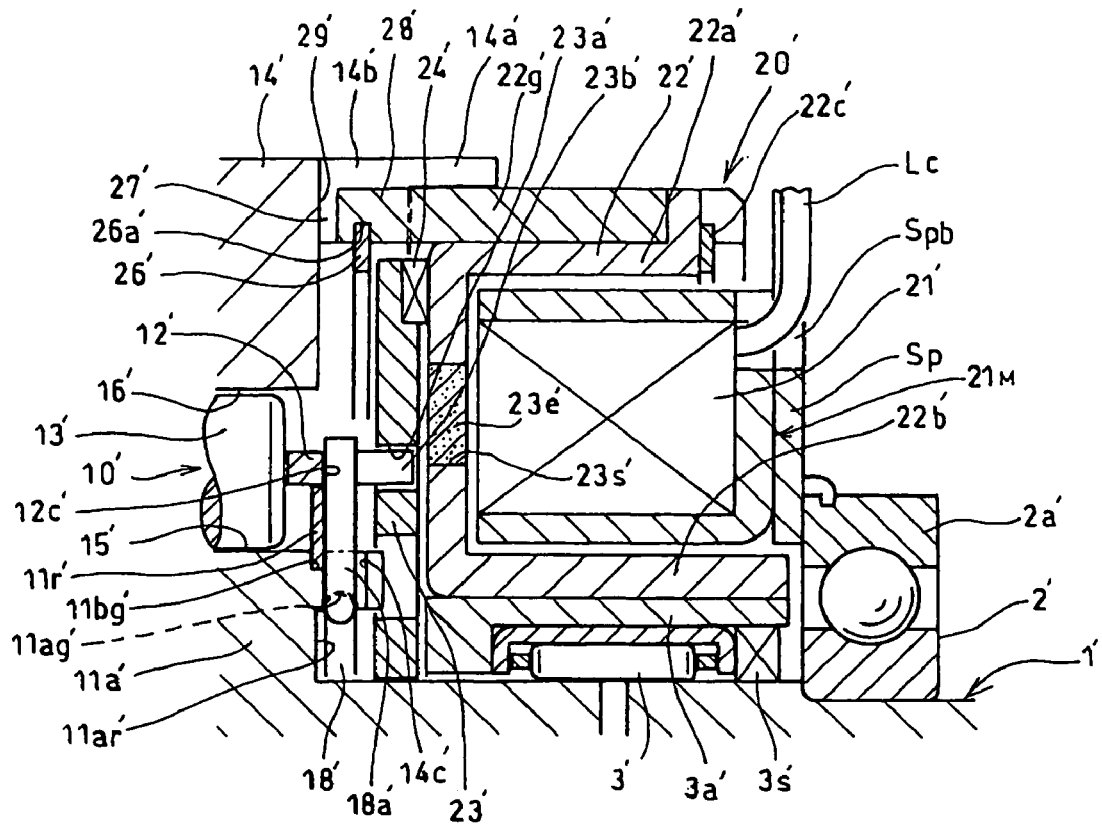
FIG. 14 is an enlarged sectional view of the device of FIG. 11, showing its electromagnetic clutch unit.

As shown in FIG. 14, the outer ring 14' has at its open end first and second cylindrical portions 14a' and 14b' that are disposed axially displaced from each other. The first cylindrical portion 14a' has a larger inner diameter than the second cylindrical portion 14b'. The cover 22g' is made of a nonmagnetic material such as synthetic resin and is inserted in the first cylindrical portion 14a'. The cover 22g' has an outer diameter substantially equal to the inner diameter of the first cylindrical portion 14a'. The cover 22g' has at its end facing the outer ring 14' a plurality of protrusions 28' that are circumferentially spaced apart from each other at equal intervals and fitted in cutouts 29' formed in the first and second cylindrical portions 14a' and 14b', thereby preventing the cover 22g' from rotating relative to the outer ring 14'.

The protrusions 28' have a smaller axial length than the second cylindrical portion 14b', thereby defining discharge holes 27' for lubricating oil between the opposed end surfaces of the protrusions 28' and the cutouts 29'. A snap ring 26' is received in circumferentially aligned ring grooves 26a' formed in the inner peripheral surfaces of the protrusions 28' and the second cylindrical portion 14b' to prevent axial separation of the cover 22g' from the outer ring 14'. As shown in FIG. 11, between the input member 1' and the outer ring 14', a two-way roller clutch 10' is mounted to selectively couple and uncouple the members 1' and 14'.

Figure 12:
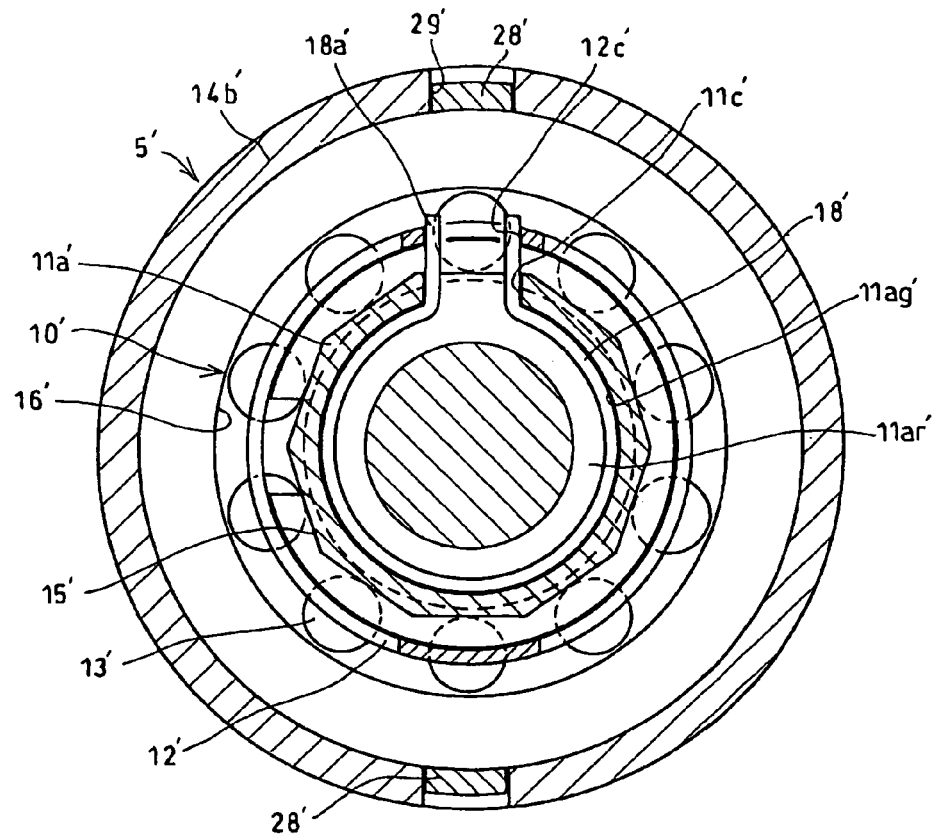
FIG. 12 is a sectional view taken along line II-II of FIG. 11.

As shown in FIGS. 11 and 12, the two-way clutch 10' includes a plurality of engaging elements 13' (rollers 13) in the form of rollers disposed between a cylindrical surface 16' (raceway 16) formed on the inner periphery of the outer ring 14' and having the same diameter as the bearing fitting surface 16a' and a plurality of cam surfaces 15' (cam surfaces 15) formed on the outer periphery of the large-diameter portion 11a' of the input member 1' and defining wedge-shaped spaces between the cam surfaces and the cylindrical surface 16'. The engaging elements 13' are retained by a retainer 12' (retainer 12) mounted between the large-diameter portion 11a' and the outer ring 14'. By rotating the retainer 12' relative to the input member 1', the engaging elements 13' are selectively brought into and out of engagement with the cylindrical surface 16' and the cam surfaces 15'.

As shown in FIGS. 12 and 14, a recess 11ar' is formed in the end surface of the large-diameter portion 11a'. A ring groove 11ag' (groove 11a) is formed in the inner surface of the peripheral wall defining the recess 11ar'. A C-shaped switch spring 18' (switch spring 18) is received in the ring groove 11ag'. The switch spring 18' has radially outwardly bent end portions 18a' (end portions 18a) that are inserted through a cutout 11c' (cutout 11c) formed in the peripheral wall defining the recess 11ar' and a cutout 12c' (cutout 12c) formed in the end surface of the retainer 12', thereby biasing the circumferentially opposed ends of the respective cutouts 11c' and 12c' in directions away from each other and biasing the retainer 12' toward a neutral position where the engaging elements 13' disengage from the cylindrical surface 16' and the cam surfaces 15'.

As shown in FIG. 11, the retainer 12' has a radially inwardly extending flange 12a' at its front end which is rotatably supported on a large-diameter portion 11c' of the stepped shaft portion 11b'. As shown in FIG. 14, a snap ring 11r' is fitted in a ring groove 11bg' formed in the outer periphery of the large-diameter portion 11a'. The snap ring 11r' rotatably supports the inner periphery of the retainer 12' near its rear end. The ring groove 11ag' in which the switch spring 18' is received has such a depth that the switch spring 18' does not come out of the groove 11ag' when the spring 18' is compressed to its limit.

As shown in FIG. 11, an electromagnetic clutch 20' (electromagnetic clutch 20) is disposed between the input member 1' and the cover 22g' to selectively engage and disengage the two-way clutch 10'. As shown in FIG. 14, the electromagnetic clutch 20' comprises an armature 23' (armature 23) axially facing the retainer 12', a rotor 22' (rotor 22) axially facing the armature 23', an electromagnet 21$_M$' axially facing the rotor 22', and a separation spring 24' (separation spring 24) biasing the armature 23' away from the rotor 22'. The armature 23' has a plurality of holes 23$a$' in which protrusions 23$b$' formed on the end surface of the retainer 12' are received so that the armature 23' is rotationally fixed but axially movable relative to the retainer 12'.

The rotor 22' includes an outer cylindrical portion 22$a$' and an inner cylindrical portion 22$b$'. The outer cylindrical portion 22$a$' is pressed into and rotationally fixed to the cover 22$g$'. Also, its axial movement is prevented by a snap ring 22$c$' secured to the inner periphery of the cover 22$g$' at its rear end. A sleeve 3$a$' made of a nonmagnetic material is pressed into the inner cylindrical portion 22$b$'. The rotor 22' is rotatably supported on the input member 1' through a bearing 3' (bearing 3) disposed between the sleeve 3$a$' and the input member 1'. A seal member 3$s$' is also disposed between the sleeve 3$a$' and the input member 1' to prevent the entry of foreign matter.

Figure 13:
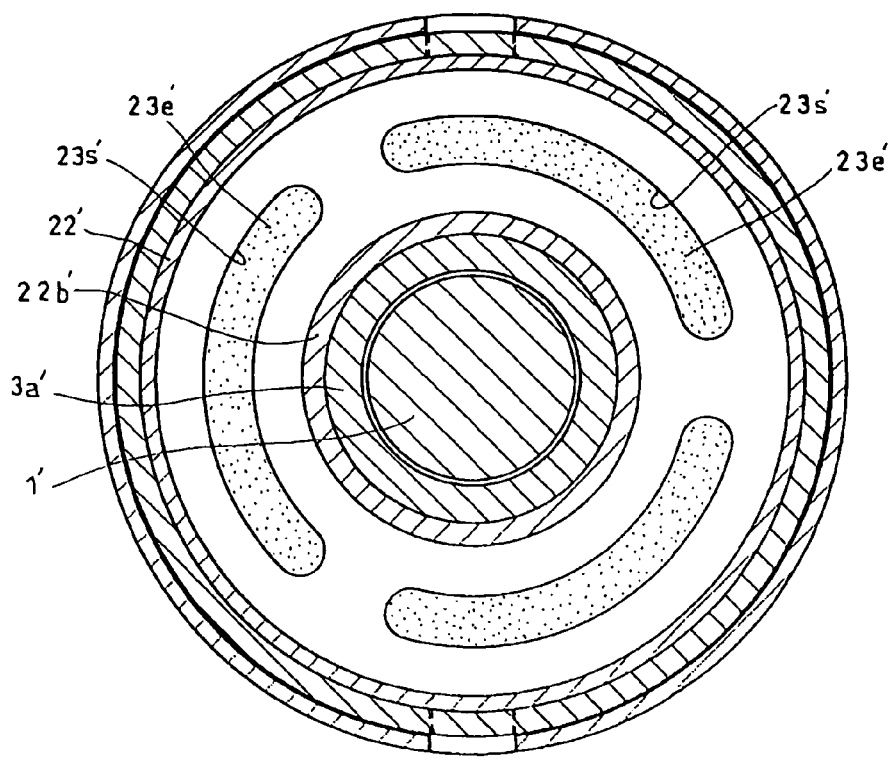
FIG. 13 is a sectional view taken along line III-III of FIG. 11.
Figure 15:
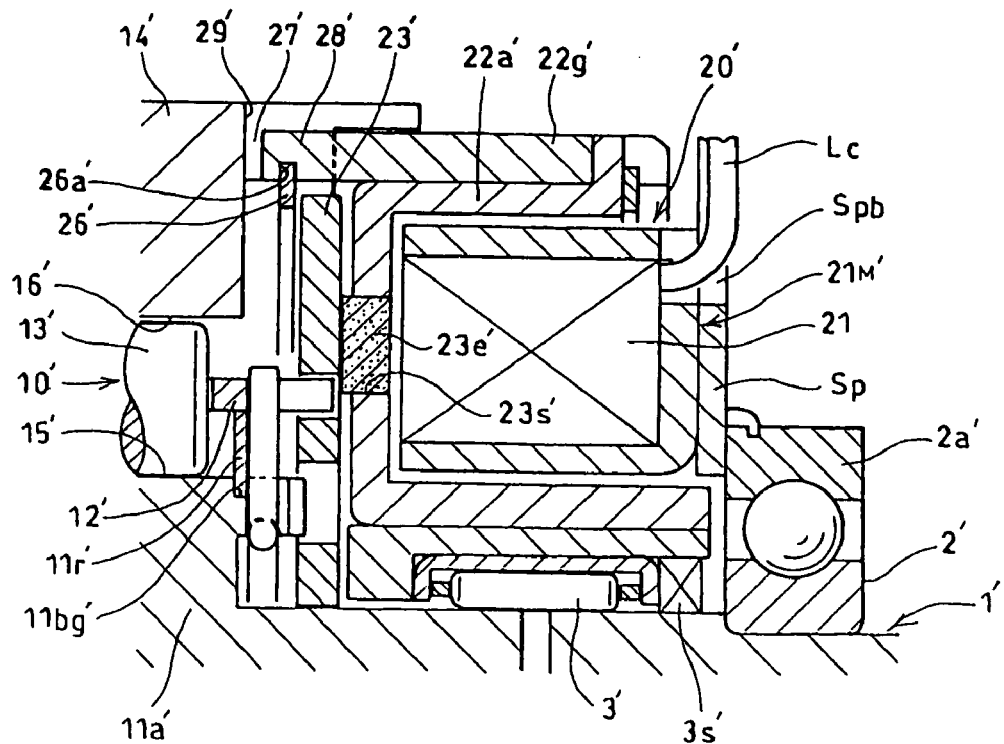
FIG. 15 is a sectional view of a different electromagnetic clutch.

As shown in FIG. 13, the rotor 22' is formed with a plurality of arcuate slits 23$s$' defining a circle in its portion facing the armature 23'. An elastic member 23$e$' made of a nonmagnetic material is fitted in each slit 23$s$'. The elastic members 23$e$' prevent the entry of foreign matter through the slits 23$s$'. In the arrangement of FIG. 15, the elastic members 23$e$' axially protrude from the surface of the rotor 22' facing the armature 23' (and adapted to be magnetically attracted to the armature). With this arrangement, it is possible to omit the separation spring 24'.

The electromagnet 21$_M$' is disposed between the outer and inner cylindrical portions 22$a$' and 22$b$' of the rotor 22'. The electromagnet 21$_M$' includes an electromagnetic coil 21' (electromagnetic coil 21). By energizing the electromagnetic coil 21', the armature 23' is attracted to the rotor 22'. The electromagnet 21$_M$' is supported on a support plate Sp, which is in turn supported on an outer ring 2$a$' of a bearing 2' rotatably supporting the input member 1'. By supporting the electromagnet 21$_M$' on the outer ring 2$a$' of the bearing 2', it is possible to support the electromagnet 21$_M$' so as to be coaxial with the input member 1' with high accuracy.

As shown in FIG. 11, the support plate Sp has an arm Spa extending from its radially outer edge and having its free end screwed to a stationary member B. The arm Spa is formed with a slit Spb in which a lead wire Lc of the electromagnetic coil 21' is received and fixed to the arm e.g. by means of an adhesive or by molding with a synthetic resin.

As shown in FIG. 11, the input member 1' has an oil supply passage 60 having an inlet 60$a$ at the end surface of the input member 1'. Lubricating oil supplied into the oil supply passage 60 from its inlet 60$a$ flows into the bearing 3' supporting the sleeve 3$a$' to lubricate the bearing 3', and flows through the gap between the sleeve 3$a$' and the input member 1' to lubricate the opposed surfaces of the armature 23' and the rotor 22' and the two-way roller clutch 10'. A filter 61 is mounted in the inlet 60$a$ to catch any foreign matter contained in lubricant.

While the electromagnetic coil 21' of the electromagnet 21$_M$' is not energized, the engaging elements 13' of the two-way clutch 10' are kept in neutral position shown in FIG. 12, where the engaging elements 13' are not in engagement with the cylindrical surface 16' and the cam surfaces 15'. Thus, even if the input member 1' is rotating in this state, its rotation is not transmitted to the output member 5'. In this state, because the retainer 12' is coupled to the input member 1' through the switch spring 18', the retainer 12' and the engaging elements 13' rotate together with the input member 1'.

When the electromagnetic coil 21' is energized while the input member 1' is rotating, the armature 23' is magnetically attracted toward the rotor 22' against the force of the separation spring 24' until pressed against the rotor 22'. The resulting frictional resistance produced therebetween acts on the retainer 12' as rotational resistance, thereby causing the retainer 12' to rotate relative to the input member 1'. This in turn causes the engaging elements 13' to engage the cylindrical surface 16' and the cam surfaces 15'. The rotation of the input member 1' is now transmitted to the output member 5' through the engaging elements 13'.

When the input member 1' and the retainer 12' rotate relative to each other, the switch spring 18' is elastically deformed, i.e. radially compressed. But because the ring groove 11$ag$' has a depth sufficient to retain the switch spring 18' in position even when the switch spring 18' is radially compressed to a maximum degree, the switch spring 18' never comes out of the ring groove 11$ag$'. When the electromagnetic coil 21' is deenergized, the retainer 12' rotates under the force of the switch spring 18' back to the neutral position where the engaging elements 13' disengage from the cylindrical surface 16' and the cam surfaces 15'.

In this embodiment, because the cover 22$g$' is coupled to the open end of the outer ring 14' to support the rotor 22', and the cover 22$g$' is made of a nonmagnetic material, it is possible to reduce the axial length of the outer ring 14' to such a degree as to be able to barely cover the two-way roller clutch 10'. This in turn makes it possible to reduce the weight of the rotation transmission device. Also, because the protrusions 28' formed on the end surface of the cover 22$g$' are engaged in the cutouts 29' formed in the first and second cylindrical portions 14$a$' and 14$b$' of the outer ring 14' to rotationally fix the cover 22$g$', and the protrusions 28' and the second cylindrical portion 14$b$' are axially coupled together by the snap ring 26' fitted on the radially inner surface of the second cylindrical surface 14$b$', even when the output member 5' rotates at high speed, it is possible to reliably prevent separation of the snap ring 26' and thus the cover.

Figure 17:
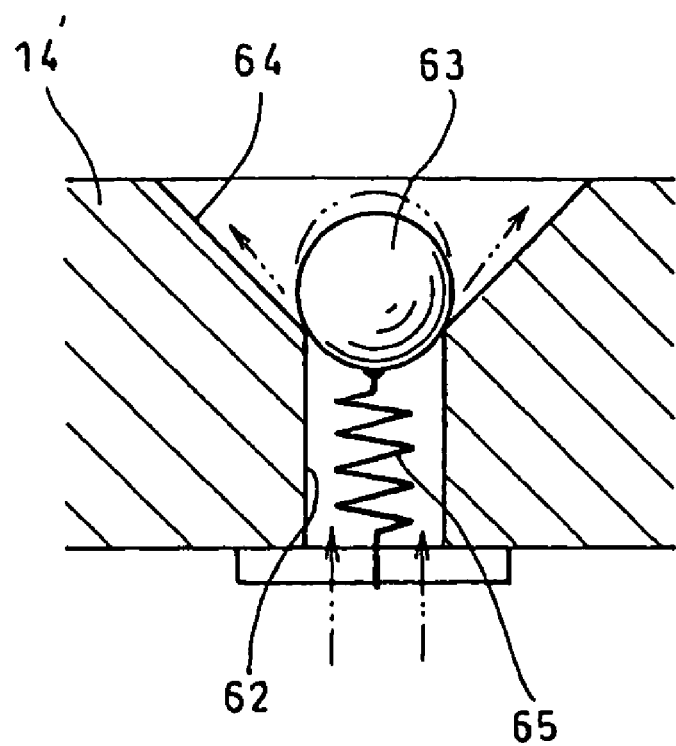
FIG. 17 is a sectional view of a different discharge hole of the rotation transmission device of FIG. 11.
Figure 18:
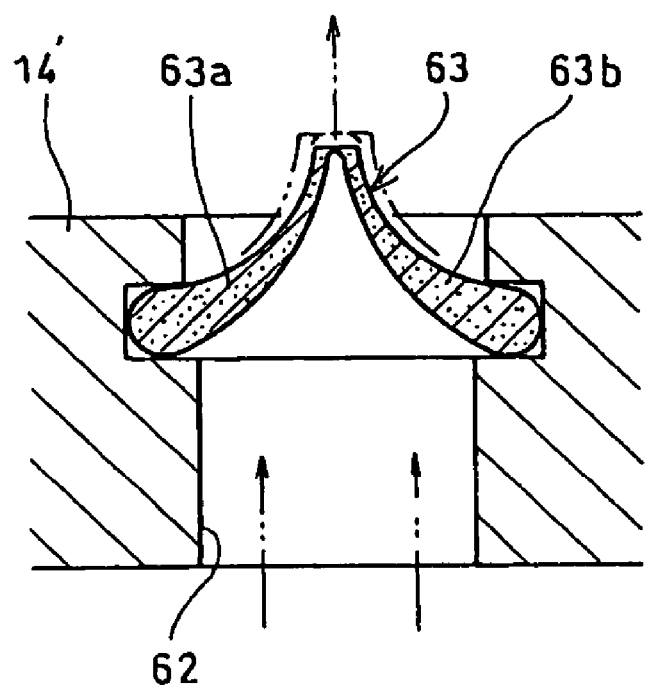
FIG. 18 is a sectional view of a yet another discharge hole of the rotation transmission device of FIG. 11.

The discharge holes 27' formed between the protrusions 28' and the cutouts 29' eliminate the need to form discharge holes later. This leads to a reduction in the machining cost of the outer ring 14' or the cover 22$g$'. As shown in FIGS. 17 and 18, if a discharge hole 62 is formed in the outer ring 14' later, a valve body 63 that opens under centrifugal force produced when the outer ring 14' rotates is preferably mounted in the discharge hole 62 to prevent the entry of foreign matter through the discharge hole 62 while the output member 5' is not rotating by closing the discharge hole 62 with the valve body 63.

More specifically, in the arrangement of FIG. 17, the valve body 63 is a spherical member pressed by a tension spring 65 against a conical seating surface 64 formed on the radially outer end of the discharge hole 62 so as to be separable from the seating surface 64 against the force of the spring 65. In the arrangement of FIG. 18, the valve body 63 comprises two elastic members 63$a$ and 63$b$ mounted in the discharge hole 62. The elastic members 63$a$ and 63$b$ are normally in elastic contact with each other to prevent the entry of foreign matter. Under centrifugal force produced when the outer ring rotates or due to an increase in the internal pressure, the elastic members 63$a$ and 63$b$ separate from each other, allowing lubricating oil to be discharged through the gap therebetween.

As shown in FIG. 15, by mounting the elastic members 23$e$' in the slits 23$s$' formed in the rotor 22' so that the elastic members 23$e$' protrude from the surface of the rotor 22' facing the armature 23', the elastic members 23$e$' serve to separate the armature 23' from the rotor 22'. This eliminates the need for the separation spring 24' shown in FIG. 14, thus reducing the cost. Also as shown in FIG. 14, by pressing the sleeve 3$a$' into the rotor 22' and mounting the seal member 3s' as a seal means in the sleeve 3a', it is possible to seal between the sleeve 3a' and the input member 1'.

Further, as shown in FIG. 11, by forming the ring groove 11bg' in the outer periphery large-diameter portion 11a' and fitting the snap ring 11r' in the ring groove 11bg' to support the radially inner surface of the retainer 12', it is possible to prevent separation of the snap ring 11r' even when the input member 1' rotates at a high speed. The retainer 12' can thus be stably supported at all times. Also as shown in FIG. 11, by determining the inner diameter of the bearing fitting surface 16' formed on the inner periphery of the outer ring 14' to be equal to the inner diameter of the cylindrical surface 16' forming the two-way roller clutch 10', the inner periphery of the outer ring 14' can be machined easily, so that it is possible to reduce the machining cost.

In the embodiment, the cylindrical surface 16' is formed on the inner periphery of the outer ring 14', and the cam surfaces 15' are formed on the outer periphery of the large-diameter portion 11a'. But instead, cam surfaces may be formed on the inner periphery of the outer ring 14', and a cylindrical surface may be formed on the outer periphery of the large-diameter portion. In this case, the outer ring 14' and the retainer 12' are coupled together through the switch spring for keeping the engaging elements 13' in neutral position, and the rotor 22' of the electromagnetic clutch 20 is rotationally fixed to the input member 1'.

According to the present invention, it is possible to further reduce the energy consumption of a rotation transmission device when it engages and reduce its weight. Thus, the concept of the invention is applicable to various rotation transmission devices of the type in which its roller clutch is selectively engaged and disengaged by electromagnetic force.

What is claimed is:

1. A control system for a rotation transmission device, comprising a rotation transmission device comprising a roller clutch unit including an inner member, an outer ring and rollers as engaging elements disposed between said inner member and said outer ring for selectively transmitting torque of a rotary shaft, and an electromagnetic clutch unit including an electromagnetic coil for selectively engaging and disengaging said roller clutch unit by electromagnetic force produced by said electromagnetic coil; a variable setting unit for variably applying current to said electromagnetic coil corresponding to a relative revolving speed between said inner member and said outer ring when said roller clutch unit engages; and a control unit for controlling said variable setting unit;

wherein said electromagnetic coil is divided into two portions by connecting a central line to a central portion of said electromagnetic coil, and wherein a switch is provided downstream of said variable setting unit, said switch being operable to effect a change-over between a drive mode in which electric power is applied to said electromagnetic coil through a power supply line and a heating mode in which electric power is applied to said electromagnetic coil through said central line to apply currents that are opposite in direction to each other to said two portions of said coil, respectively, thereby producing magnetic fluxes from said two portions of said electromagnetic coil that cancel each other.

2. The control system of claim 1 wherein said variable setting unit applies a current that is greater than a reference current necessary to keep said roller clutch unit engaged by a factor of n which is greater than 1 to said electromagnetic coil, and applies said reference current to said electromagnetic coil after said roller clutch unit has engaged, said variable setting unit being configured to adjust said reference current and the value of n according to said relative revolving speed.

3. The control system of claim 2 wherein after said roller clutch unit has engaged, current is intermittently applied to said electromagnetic coil according to said relative revolving speed.

4. The control system of claim 1 wherein after said roller clutch unit has engaged, current is intermittently applied to said electromagnetic coil according to said relative revolving speed.

5. A rotation transmission device comprising a roller clutch unit including an inner member, an outer ring and rollers as engaging elements disposed between said inner member and said outer ring for selectively transmitting torque of a rotary shaft, an electromagnetic clutch unit including an electromagnetic coil for selectively engaging and disengaging said roller clutch unit by electromagnetic force produced by said electromagnetic coil and a variable setting unit for variably applying current to said electromagnetic coil, wherein when said roller clutch unit engages, a rated current corresponding to a rated revolving speed which is approximately a revolving speed of said rotary shaft when said electromagnetic coil is activated most frequently is applied to said electromagnetic coil, wherein when said roller clutch unit engages, said variable setting unit applies electric power to said electromagnetic coil according to a relative revolving speed between said inner member and said outer ring so that said roller clutch is engageable by a current corresponding to the relative revolving speed, wherein said electromagnetic coil is divided into two portions by connecting a central line to a central portion of said electromagnetic coil, and wherein said electromagnetic coil is selectively changed over between a drive mode in which electric power is applied to both ends of said electromagnetic coil to produce attraction force from said electromagnetic coil and a heating mode in which electric power is applied to said electromagnetic coil through said central line to apply currents that are opposite in direction to each other to said two portions of said coil, respectively, thereby producing magnetic fluxes from said two portions of said electromagnetic coil that cancel each other.

6. The rotation transmission device of claim 5 wherein said inner member is mounted on said rotary shaft, wherein said outer ring is coaxially and rotatably mounted around said inner member, wherein a plurality of cam surfaces are formed on one of an outer periphery of said inner member and an inner periphery of said outer ring, wherein a raceway is formed on the other of said outer periphery of said inner member and said inner periphery of said outer ring, wherein a retainer is disposed between said outer periphery and said inner periphery and is formed with as many pockets as said cam surfaces, wherein each of said rollers is received in one of said pockets, wherein said electromagnetic clutch unit comprises a rotor mounted to said other of said outer periphery of said inner member and said inner periphery of said outer ring, an armature provided on one side of said rotor, said electromagnetic coil being provided on an opposite side of said rotor, an elastic member biasing said armature and said rotor away from each other, said armature being rotationally fixed to but axially movable relative to said retainer, and wherein said retainer and the one of the inner member and the outer ring formed with said cam surfaces is joined together through a neutral position retaining member biasing said retainer toward a neutral position where said roller clutch unit is not engaged by said rollers.

7. The rotation transmission device of claim 6 wherein said cam surfaces are formed on an outer periphery of a large-diameter portion of said inner member, wherein said raceway is a cylindrical surface formed on the inner periphery of said outer ring, said cam surfaces and said cylindrical surface defining wedge-shaped spaces therebetween, said electromagnetic clutch unit including a rotor guide through which said rotor is coupled to said outer ring, said rotor guide being a nonmagnetic cover provided separately from said outer ring, wherein a protrusion is formed on one of opposed end surfaces of said outer ring and said cover and is engaged in a cutout formed in the other of said opposed end surfaces, and wherein a coupling means is provided radially inwardly of the portion where said protrusion engages in said cutout for axially inseparably coupling said cover to said outer ring.

8. The rotation transmission device of claim 7 wherein said coupling means comprises ring grooves formed in the inner periphery of said outer ring at an open end thereof and an inner periphery of said protrusion, and a radially elastically deformable snap ring engaged in said ring grooves.

9. The rotation transmission device of claim 8 wherein a discharge hole for lubricating oil is defined between axially opposed end surfaces of said cutout and said protrusion.

10. The rotation transmission device of claim 7 herein a discharge hole for lubricating oil is defined between axially opposed end surfaces of said cutout and said protrusion.

11. The rotation transmission device of claim 7 wherein arcuate slits defining a circle are formed in a surface of said rotor opposed to and adapted to be attracted to said armature, and wherein nonmagnetic elastic members are each received in one of said slits so as to protrude from said surface of said rotor.

12. The rotation transmission device of claim 7 wherein a seal is provided radially inwardly of said rotor.

13. The rotation transmission device of claim 7 wherein said retainer has its inner periphery supported at its end on an outer periphery of a snap ring engaged in a ring groove formed in the outer periphery of said inner member.

14. The rotation transmission device of claim 7 wherein a recess is formed in an end surface of said large-diameter portion of said inner member, wherein a ring groove is formed in a radially inner surface of a radially outer wall of said recess, and wherein a switch spring is mounted in said ring groove.

15. The rotation transmission device of claim 7 wherein said outer ring is rotatably supported on said inner member through a bearing fitted in a bearing fitting surface formed on the inner periphery of said outer ring, said bearing fitting surface having the same diameter as said cylindrical surface.

* * * * *